(12) United States Patent
Peach et al.

(10) Patent No.: US 8,780,788 B2
(45) Date of Patent: Jul. 15, 2014

(54) SYSTEMS AND METHODS FOR DECODING AUTOMATIC IDENTIFICATION SYSTEM SIGNALS

(75) Inventors: Robert Peach, Cambridge (CA); Weiguo Chen, Cambridge (CA)

(73) Assignee: COM DEV International Ltd., Cambridge, Ontario ( * ) Notice: Subject to any disclaimer, the term of this patent is extended or adjusted under 35 U.S.C. 154(b) by 1001 days.

(21) Appl. No.: 12/567,104

(22) Filed: Sep. 25, 2009

(65) Prior Publication Data

US 2011/0075602 A1 Mar. 31, 2011

(51) Int. Cl.
*H04B 7/204* (2006.01)
*H04H 60/32* (2008.01)

(52) U.S. Cl.
USPC ............................................ 370/319; 725/19

(58) Field of Classification Search
USPC ................ 370/328; 375/150; 725/37, 141, 19
See application file for complete search history.

(56) References Cited

U.S. PATENT DOCUMENTS

| | | |
|---|---|---|
| 3,307,188 A | 2/1967 | Marchetti et al. |
| 3,725,938 A | 4/1973 | Black |
| 3,825,928 A | 7/1974 | Williams |
| 3,842,417 A | 10/1974 | Williams |
| 4,023,170 A | 5/1977 | Buss |
| 4,028,699 A | 6/1977 | Stevens |
| 4,114,142 A | 9/1978 | Wycoff et al. |
| 4,129,873 A | 12/1978 | Kennedy |
| 4,276,551 A | 6/1981 | Williams et al. |
| 4,359,733 A | 11/1982 | O'Neill |
| 5,029,184 A | 7/1991 | Andren et al. |
| 5,103,461 A | 4/1992 | Tymes |
| 5,132,694 A | 7/1992 | Sreenivas |
| 5,142,550 A | 8/1992 | Tymes |
| 5,157,687 A | 10/1992 | Tymes |

(Continued)

FOREIGN PATENT DOCUMENTS

| | | |
|---|---|---|
| AU | 2008258219 B2 | 1/2013 |
| AU | 2013200747 A1 | 3/2013 |

(Continued)

OTHER PUBLICATIONS

Dahl (Dahl, Ole Fredrik Haakonsen; NTNU; Jun. 2006;Space Based AIS Receiver for Maritime Traffic Monitoring Using Interference Cancellation).*

(Continued)

*Primary Examiner* — Afshawn Towfighi
(74) *Attorney, Agent, or Firm* — Bereskin & Parr LLP/S.E.N.C.R.L., s.r.l.

(57) ABSTRACT

A method of extracting automatic identification system (AIS) message segments from AIS signals received by a satellite. The method includes: (a) receiving AIS signals from satellite antennas; (b) generating multiple versions of the AIS signals; (c) extracting message segments contained within each of the AIS signals using one or more AIS receivers; (d) sorting the message segments by time; and (e) deleting any duplicate message segments. Multiple versions of the AIS signals may be generated by one or more of the following methods: (i) processing the AIS signals multiple times, each time with different AIS receiver parameter settings; (ii) splitting each signal into multiple signals and filtering each of the multiple signals separately; (iii) receiving multiple AIS signals and combining them with different phases and amplitudes to produce a plurality of combined AIS signals; and (iv) removing extracted message segments from the received AIS signals and reprocessing the modified AIS signals.

20 Claims, 10 Drawing Sheets

(56) References Cited

U.S. PATENT DOCUMENTS

| | | | |
|---|---|---|---|
| 5,233,358 A | 8/1993 | Murphy |
| 5,280,498 A | 1/1994 | Tymes et al. |
| 5,359,521 A | 10/1994 | Kyrtsos et al. |
| 5,375,059 A | 12/1994 | Kyrtsos et al. |
| 5,379,448 A | 1/1995 | Ames et al. |
| 5,390,125 A | 2/1995 | Sennott et al. |
| 5,401,944 A | 3/1995 | Bravman et al. |
| 5,420,809 A | 5/1995 | Read et al. |
| 5,438,517 A | 8/1995 | Sennott et al. |
| 5,442,558 A | 8/1995 | Kyrtsos et al. |
| 5,479,441 A | 12/1995 | Tymes et al. |
| 5,490,073 A | 2/1996 | Kyrtsos |
| 5,506,587 A | 4/1996 | Lans |
| 5,528,221 A | 6/1996 | Jeuch et al. |
| 5,528,621 A | 6/1996 | Heiman et al. |
| 5,550,743 A | 8/1996 | Kyrtsos |
| 5,555,503 A | 9/1996 | Kyrtsos et al. |
| 5,579,016 A | 11/1996 | Wolcott et al. |
| 5,629,855 A | 5/1997 | Kyrtsos et al. |
| 5,668,803 A | 9/1997 | Tymes et al. |
| 5,706,313 A | 1/1998 | Blasiak et al. |
| 5,754,139 A | 5/1998 | Turcotte et al. |
| 5,815,811 A | 9/1998 | Pinard et al. |
| 6,002,918 A | 12/1999 | Heiman et al. |
| 6,011,512 A | 1/2000 | Cohen |
| 6,044,323 A | 3/2000 | Yee et al. |
| 6,104,978 A | 8/2000 | Harrison et al. |
| 6,148,040 A | 11/2000 | Nguyen et al. |
| 6,185,427 B1 | 2/2001 | Krasner et al. |
| 6,236,354 B1 | 5/2001 | Krasner |
| 6,298,242 B1 | 10/2001 | Schiff |
| 6,314,269 B1 | 11/2001 | Hart et al. |
| 6,370,126 B1 | 4/2002 | De Baere et al. |
| 6,374,104 B1 | 4/2002 | Croq et al. |
| 6,421,000 B1 | 7/2002 | McDowell |
| 6,427,121 B2 | 7/2002 | Brodie |
| 6,512,720 B1 | 1/2003 | Yang |
| 6,522,301 B2 | 2/2003 | Takayama et al. |
| 6,522,643 B1 | 2/2003 | Jacomb-Hood |
| 6,536,354 B1 | 3/2003 | Madison et al. |
| 6,611,757 B2 | 8/2003 | Brodie |
| 6,658,349 B2 | 12/2003 | Cline |
| 6,738,358 B2 | 5/2004 | Bist et al. |
| 6,813,263 B1 | 11/2004 | Margherita |
| 6,823,170 B1 | 11/2004 | Dent |
| 7,047,114 B1 | 5/2006 | Rogers |
| 7,205,933 B1 | 4/2007 | Snodgrass |
| 7,265,713 B2 | 9/2007 | Lewis |
| 7,317,916 B1 | 1/2008 | Chang et al. |
| 7,526,249 B2 | 4/2009 | Waltman et al. |
| 7,594,260 B2 | 9/2009 | Porras et al. |
| 7,876,865 B2 | 1/2011 | Peach |
| 8,295,325 B2 | 10/2012 | Guey |
| 8,374,292 B2 | 2/2013 | Peach |
| 2002/0061073 A1 | 5/2002 | Huang et al. |
| 2003/0017827 A1 | 1/2003 | Ciaburro et al. |
| 2004/0039504 A1 | 2/2004 | Coffee et al. |
| 2004/0166807 A1 | 8/2004 | Vesikivi et al. |
| 2004/0174895 A1 | 9/2004 | Hiraoka et al. |
| 2004/0183673 A1 | 9/2004 | Nageli |
| 2004/0193367 A1 | 9/2004 | Cline |
| 2004/0217000 A1 | 11/2004 | Yamamoto et al. |
| 2004/0217900 A1 | 11/2004 | Martin et al. |
| 2005/0060739 A1* | 3/2005 | Verna ............... 725/19 |
| 2005/0124291 A1 | 6/2005 | Hart et al. |
| 2005/0248486 A1 | 11/2005 | Lee et al. |
| 2005/0271000 A1 | 12/2005 | Schulist |
| 2006/0087456 A1 | 4/2006 | Luby |
| 2006/0107192 A1 | 5/2006 | Mantha et al. |
| 2006/0109106 A1 | 5/2006 | Braun |
| 2006/0114862 A1 | 6/2006 | Hiraoka |
| 2006/0129288 A1 | 6/2006 | Yanagi |
| 2006/0199612 A1 | 9/2006 | Beyer et al. |
| 2006/0205370 A1 | 9/2006 | Hayashi et al. |
| 2008/0086267 A1 | 4/2008 | Stolte |
| 2008/0088485 A1 | 4/2008 | Stolte et al. |
| 2008/0220771 A1 | 9/2008 | Agarwal |
| 2008/0304597 A1 | 12/2008 | Peach |
| 2009/0161797 A1 | 6/2009 | Cowles |
| 2010/0061427 A1 | 3/2010 | Lopez-Risueno et al. |
| 2011/0075602 A1 | 3/2011 | Peach et al. |
| 2011/0304502 A1 | 12/2011 | Chen et al. |

FOREIGN PATENT DOCUMENTS

| | | | |
|---|---|---|---|
| CA | 2653203 A1 | 12/2007 |
| CA | 2687322 A1 | 12/2008 |
| CA | 2715155 A1 | 3/2011 |
| EP | 1 202 388 A2 | 5/2002 |
| EP | 2024754 A2 | 2/2009 |
| EP | 2211486 B1 | 1/2013 |
| EP | 2302821 B1 | 6/2013 |
| EP | 2651046 A2 | 10/2013 |
| IN | 66DELNP2010 A | 8/2010 |
| JP | 2003109200 | 4/2003 |
| JP | 20050181078 | 7/2005 |
| WO | WO 02/09318 A2 | 1/2002 |
| WO | WO03/046603 | 6/2003 |
| WO | WO 03/048603 A1 | 6/2003 |
| WO | WO 2004/010572 A1 | 1/2004 |
| WO | WO2007/143478 | 12/2007 |
| WO | WO 2007/143478 A2 | 12/2007 |
| WO | WO 2008/148188 | 12/2008 |
| WO | WO2008/148188 | 12/2008 |
| WO | 2013152427 A1 | 10/2013 |

OTHER PUBLICATIONS

Notice of Allowance in relation to U.S. Appl. No. 11/760,358, mailed on Oct. 1, 2010.

Examiner-Initiated Interview Summary in relation to U.S. Appl. No. 11/760,358, dated Oct. 1, 2010.

Amendment in relation to U.S. Appl. No. 11/760,358 dated Jul. 14, 2010.

Office Action in relation to U.S. Appl. No. 11/760,358, mailed Apr. 14, 2010.

European Communication dated Dec. 19, 2011, European Application No. 10192812.5.

Preliminary Amendment dated Oct. 30, 2007, U.S. Appl. No. 11/760,358.

Office Action in relation to U.S. Appl. No. 12/915,699, mailed on Apr. 10, 2012.

Intention to Grant dated Jul. 25, 2012, European Application No. 09250993.4.

Office Action in relation to U.S. Appl. No. 12/360,473, dated Jul. 18, 2011.

Wikipedia Article, "Analog-to-Digital Converter", retrieved Jun. 2009 version.

Response and Disclaimer dated Jul. 9, 2012, U.S. Appl. No. 12/915,699.

Notice of Abandonment dated Feb. 8, 2012, U.S. Appl. No. 12/360,473.

Co-pending U.S. Appl. No. 12/915,699, entitled "System and Method for Decoding Automatic Identification System Signals" filed Oct. 29, 2010.

Office Action in relation to U.S. Appl. No. 12/797,066, dated May 30, 2012.

Co-pending U.S. Appl. No. 12/797,066 entitled, "Systems and Methods for Segmening a Satellite Field of View for Detecting Radio Frequency Signals", filed Jun. 9, 2010.

Co-pending U.S. Appl. No. 12/360,473 entitled, "Satellite Detection of Automatic Identification System Signals", filed Jan. 27, 2009.

Office Action dated Apr. 1, 2011, Australian Application No. 2008258219.

Office Action dated Apr. 4, 2012, Australian Application No. 2008258219.

Office Action dated Dec. 29, 2011, Indonesian Application No. W00200903348.

Response dated Oct. 8, 2010, European Application No. 08748111.5.

(56) References Cited

OTHER PUBLICATIONS

Office Action dated Apr. 17, 2012, European Application No. 08748111.5.
Office Action dated May 30, 2012, European Application No. 08748111.5.
International Preliminary Report on Patentability dated Dec. 11, 2009, PCT Application No. PCT/CA2008/000666.
European Communication dated Apr. 11, 2012, European Application No. 10178715.8.
European Communication dated Aug. 2, 2010, European Application No. 09250993.4.
Response dated Oct. 1, 2010, European Application No. 09250993.4.
Response dated Aug. 23, 2011, European Application No. 09250993.4.
Summons to Attend Oral Proceedings dated Mar. 13, 2012, European Application No. 09250993.4.
Written Submissions dated Jun. 1, 2012, European Application No. 09250993.4.
Written Submissions dated Jun. 13, 2012, European Application No. 09250993.4.
Examiner's Result of Consultation dated Jun. 27, 2012, European Application No. 09250993.4.
EP Communication dated Jul. 27, 2012, European Application No. 08748111.5.
Response dated Jun. 13, 2012, European Application No. 10192812.5.
Amendment dated Mar. 1, 2010, European Application No. 08748111.5.
Response dated Aug. 23, 2012, European Application No. 08748111.5.
European Notice of Allowance dated Jan. 4, 2013 for Application No. 10178715.8.
Extended European Search Report dated Mar. 5, 2012, European Application No. 10178715.8.
Cervera, Miguel et al., "On the Performance Analysis of a Satellite-based AIS System", Signal Processing for Space Communications, 2008, SPSC 2008, 10th International Workshop ON, IEEE, Piscataway, NJ, USA, Oct. 6, 2008, pp. 1-8.
Naoues, Malek et al., "Design of an RF-subsampling Based Tri-band AIS and DSC Radio Receiver", Cognitive Radio and Advanced Spectrum Management, 2009, Cogart 2009, Second International Workshop ON, IEEE, Piscataway, NJ, USA, May 18, 2009, pp. 64-68.
European Examination Report dated Mar. 8, 2011 and European Search Report dated Aug. 12, 2009 for Application No. 09 250 993.4-2411.
Extended European Search Report dated May 26, 2010 for Application No. 08748111.5-2411.
Extended European Search Report dated Apr. 11, 2011 for Application No. 10192812.5-2411.
"Space-Based AIS Receiver for Maritime Traffic Monitoring Using Interference Cancellation", Jun. 30, 2006, Master of Science in Communication Technology, pp. 1-107.
PCT International Search Report and Written Opinion mailed on Jul. 24, 2008.
Comments of the National Telecommunications and Information Administration before the Federal Communications Commission on Dec. 1, 2006.
Høye et al., "Space-based AIS for global maritime traffic monitoring", Acta Astronautica, available online Sep. 17, 2007, pp. 240-245, v. 62, Elsevier.
Satellite AIS from USCG, Digital Ship, Apr. 2007, p. 26.
Cairns, "AIS and Long Range Identification & Tracking", Journal of Navigation, paper presented on Nov. 9, 2004, pp. 181-189, v. 58, Royal Institute of Navigation.
Maritime Safety and Surveillance Initiative presentation dated Apr. 2005.
Molessa, "Satellite AIS for Long Range Identification & Tracking", seminar dated Nov. 3-5, 2004.
ITU Radio Communication Study Groups Document 8B/242-E dated Sep. 9, 2005.
Tetrault, "Use of AIS for Maritime Domain Awareness", presentation dated Oct. 17, 2005.
Wahl et al., "New possible roles of small satellites in maritime surveillance", Acta Astronautica, 2004, pp. 273-277, v. 59, Elsevier.
Eriksen et al., "Maritime traffic monitoring using a space-based AIS receiver", paper presented at 55th International Astronautical Congress 2004, Vancouver, Canada.
Høye et al., "Space-based AIS for global maritime traffic monitoring", pre-print from 5th IAA Symposium on Small Satellites for Earth Observation, Apr. 4-8, 2005, Berlin.
Wahl et al., "New possible roles of small satellites in maritime surveillance", abstract available online Nov. 17, 2004.
Short Messaging System Application Concepts Study, dated Jun. 30, 2005.
FFI Facts—Space-based Surveillance, Apr. 2005.
Meland et al., "Maritime services for large-area surveillance using a space-based AIS receiver", Feb. 21, 2005.
Cairns, "AIS and Long Range Identification & Tracking", abstract published online on Apr. 18, 2005.
Høye et al., "Space-based AIS for global maritime traffic monitoring", abstract available online Sep. 17, 2007.
"Watching the watchers: satellite to demonstrate maritime surveillance for coast guard", Entrepreneur.com, Jan. 2008.
"Coast Guard looks to space for maritime awareness", U.S. Coast Guard Press Release, Jan. 24, 2007.
AIS Satellites for Global Ship Tracking, gCaptain.com, dated Aug. 7, 2007.
Euronav Navigation AI3000 AIS http://www.euronav.co.uk/Products/Hardware/AIS_receivers/AIS3000/A13000AIS_RX.htm Sep. 2009.
Smart Radio Holdings SR162 Professional AIS Receiver http://www.diytrade.com/china/4/products/254509/SR162_PROFESSIONAL_AIS_RECEIVER.html Oct. 2002.
European Search Report/Written Opinion dated Aug. 12, 2009.
Document relating to PCT Application No. PCT/CA2013/000341 dated Jul. 17, 2013 (International Search Report and Written Opnion).
Document relating to EP Application No. 087481114.5-1852 dated Aug. 19, 2013 (Intention to Grant).
Document relating to EP Application No. 10178715.8, dated May 24, 2013 (Decision to Grant).
Document relating to EP Application No. 10178715.8, dated Apr. 10, 2013 (Amendment).
Document relating to U.S. Appl. No. 12/797,066, dated Oct. 5, 2012 (Office Action).
Document relating to U.S. Appl. No. 12/797,066, dated Dec. 5, 2012 (Office Action Response).
Document relating to U.S. Appl. No. 12/797,066, dated Dec. 12, 2012 (Advisory Action).
Document relating to U.S. Appl. No. 12/797,066, dated Jan. 2, 2013 (Advisory Action Response and RCE).
Document relating to U.S. Appl. No. 12/797,066, dated Aug. 30, 2012 (Office Action Response).
Document relating to U.S. Appl. No. 12/915,699, dated Nov. 7, 2012 (Notice of Allowance).
Document relating to CA Application No. 2715155, dated Feb. 25, 2014 (Office Action).

* cited by examiner

SYSTEMS AND METHODS FOR DECODING AUTOMATIC IDENTIFICATION SYSTEM SIGNALS

FIELD

Embodiments described herein relate to systems and methods for decoding Automatic Identification System signals. More particularly, embodiments described herein relate to systems and methods for monitoring ships that send Automatic Identification System signals by receiving the signals with a low earth orbit satellite, and extracting the message segments contained therein.

BACKGROUND

The Automatic Identification System (AIS) is a maritime communications system designed for short-range (typically 20-30 nautical miles) ship-to-ship and ship-to-shore communications. The AIS system uses narrowband (i.e. 25 kHz Bandwidth) Very High Frequency (VHF) channels centered at 161.975 MHz and 162.025 MHz, with a possible additional channel at 157.375 MHz, and a communication method called Self-Organizing Time Division Multiple Access (SOTDMA).

The AIS system supports a number of different types of signal. The principal AIS signal sent by a ship is a position report that provides information pertaining to the ship's identification, location, course, speed, and other details. A position report signal typically includes a ramp-up field, a training sequence, a start flag, a message segment field, a Frame Check Sequence (FCS), an end flag field, and a buffer field. It is the message segment field that contains information pertaining to the ship from which the AIS signal was sent, such as the ship MMSI (Maritime Mobile Service Identity) and the longitude and latitude of the ship's location. The message segment field may also include other information related to the ship including the navigation status, rate of turn, true heading, etc., as well as other information such as a time stamp indicating when the information was obtained.

The AIS system also includes the use of a receiver, enabling a ship to receive AIS signals emitted by ships around it and extract the message segments contained therein. Each minute, each VHF channel is divided into 2,250 time slots, each of which can accommodate one 26.67 ms AIS transmission (i.e. AIS signal). The time slots are accurately synchronized to Coordinated Universal Time (UTC) typically using Global Positioning System (GPS), and each AIS unit reserves time slots for future AIS transmissions from the ship. Other AIS units within range can therefore maintain a map of reserved slots and avoid transmitting during these intervals. This self-organizing feature avoids signal collisions over the short ranges involved in surface transmissions.

The use of AIS is now mandatory on all ships over 300 tons engaged on international voyages, and it is also being extended to other vessels. It was originally conceived as an aid to navigation and safety, and also has potential security applications for monitoring maritime traffic. AIS signal detection could be achieved using coastal/ground stations, but the limited range of the VHF signals would require such coastal/ground stations to be situated at many locations along the coast, and even then they could only monitor the immediate coastal region.

SUMMARY

Embodiments described herein relate to methods and systems for extracting automatic identification system (AIS) message segments from at least one AIS signal received by a satellite by generating and processing multiple versions of the at least one AIS signal.

In one broad aspect there is provided a method of extracting automatic identification system (AIS) message segments from at least one AIS signal received by a satellite. The method includes: (a) receiving at least one AIS signal from at least one satellite antenna; (b) generating multiple versions of the at least one AIS signal; (c) extracting message segments contained within each of the multiple versions of the at least one AIS signal using at least one AIS receiver; (d) sorting the message segments by time; and (e) deleting any duplicate message segments.

In another feature of that aspect of the invention generating multiple versions of the at least one AIS signal includes varying at least one of (i) a parameter of the at least one AIS signal; and (ii) a parameter of the at least one AIS receiver. The parameters of the at least one AIS signal may include the frequency and amplitude of the at least one AIS signal. The parameters of the at least one AIS receiver may include the centre frequency, frequency response, and bandwidth of a bandpass filter internal to the at least one AIS receiver. The parameters of the at least one AIS signal and the at least one AIS receiver may be varied in a predetermined manner or in an adaptive manner based on the number of message segments extracted.

In another feature of that aspect, generating multiple versions of the at least one AIS signal includes: (b.1) splitting the at least one AIS signal into a predetermined number of equivalent AIS signals; and (b.2) filtering each of the equivalent AIS signals using a separate bandpass filter to produce the multiple versions of the at least one AIS signal. The number of bandpass filters and the bandwidth of each of the bandpass filters may be selected in accordance with $$B_C = B + (N-1)*(B-B_D) = N*B - (N-1)*B_D$$

where $B_D$ is the minimum bandwidth to extract message segments, B is the bandwidth of each bandpass filter, $B_C$ is the bandwidth of the AIS channel and N is the number of bandpass filters. The bandwidth of each bandpass filter may be between approximately 10 kHz and approximately 14 kHz. In some cases the number of bandpass filters is 7 and the bandwidth of each bandpass filter is approximately 12 kHz.

In another feature of that aspect, first and second AIS signals are received from first and second antennas respectively, and generating multiple versions of the at least one AIS signal includes: (b.1) splitting the first AIS signal into a predetermined number of first equivalent AIS signals; (b.2) splitting the second AIS signal into the predetermined number of second equivalent AIS signals; (b.3) phase shifting each of the second equivalent AIS signals by a different amount to produce a plurality of phase shifted AIS signals; and (b.4) combining each of the first equivalent AIS signals with one of the phase shifted AIS signals to produce the multiple versions of the at least one AIS signal. The amount of each phase shift may be predetermined. The predetermined number may be four and the amount of the phase shifts may be 0°, 90°, 180° and 270°. The predetermined number may be eight and the amount of the phase shifts may be 0°, 45°, 90°, 135°, 180°, 225°, 270°, and 315°. The amount of each phase shift may be determined adaptively based on the number of message segments extracted from each of the multiple versions of the at least one AIS signal.

In another feature of that aspect, generating multiple versions of the at least one AIS signal further includes adjusting the amplitude of at least one of the first equivalent AIS signals and the phase shifted AIS signals prior to combining each of the first equivalent AIS signals with one of the phase shifted AIS signals.

In another feature of that aspect, generating multiple versions of the at least one AIS signal includes: (b.1) generating an AIS signal representing the extracted message segments; and (b.2) subtracting the AIS signal representing the extracted message segments from the at least one AIS signal to generate a version of the at least one AIS signal. Generating multiple versions of the at least one AIS signal may further include repeating steps (b.1) to (b.2) until a number of new extracted messages falls below a predetermined threshold.

In another feature of that aspect, first and second AIS signals are received from first and second antennas respectively, and generating multiple versions of the at least one AIS signal includes: (b.1) splitting the first AIS signal into a first predetermined number of first equivalent AIS signals; (b.2) splitting the second AIS signal into the first predetermined number of second equivalent AIS signals; (b.3) filtering each of the first equivalent AIS signals using a separate bandpass filter to produce a plurality of first filtered AIS signals; (b.4) filtering each of the second equivalent AIS signals using a separate bandpass filter to produce a plurality of second filtered AIS signals; (b.5) splitting each of the first filtered AIS signals into a second predetermined number of first equivalent filtered AIS signals; and (b.6) splitting each of the second filtered AIS signals into the second predetermined number of second equivalent filtered AIS signals; (b.7) applying at least one of a phase shift and an amplitude shift to each of the second equivalent filtered AIS signals to produce a plurality of shifted AIS signals, wherein different phase and amplitude shifts are applied to each of the second equivalent filtered AIS signals corresponding to a particular second filtered AIS signal; and (b.8) combining each of the first equivalent filtered AIS signals with one of the shifted AIS signals to produce the multiple versions of the at least one AIS signal.

In another feature of that aspect, first and second AIS signals are received from first and second antennas respectively, and generating multiple versions of the at least one AIS signal includes: (b.1) splitting the first AIS signal into a first predetermined number of first equivalent AIS signals; (b.2) splitting the second AIS signal into the first predetermined number of second equivalent AIS signals; (b.3) applying at least one of a phase shift and an amplitude shift to each of the second equivalent AIS signals to produce a plurality of shifted AIS signals, wherein different phase and amplitude shifts are applied to each of the second equivalent AIS signals; (b.4) combining each of the first equivalent AIS signals with one of the shifted AIS signals to produce a plurality of combined AIS signals; (b.5) splitting each of the combined AIS signals into a second predetermined number of equivalent combined AIS signals; and (b.6) filtering each of the equivalent combined AIS signals using a separate bandpass filter to produce the multiple versions of the at least one AIS signal.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
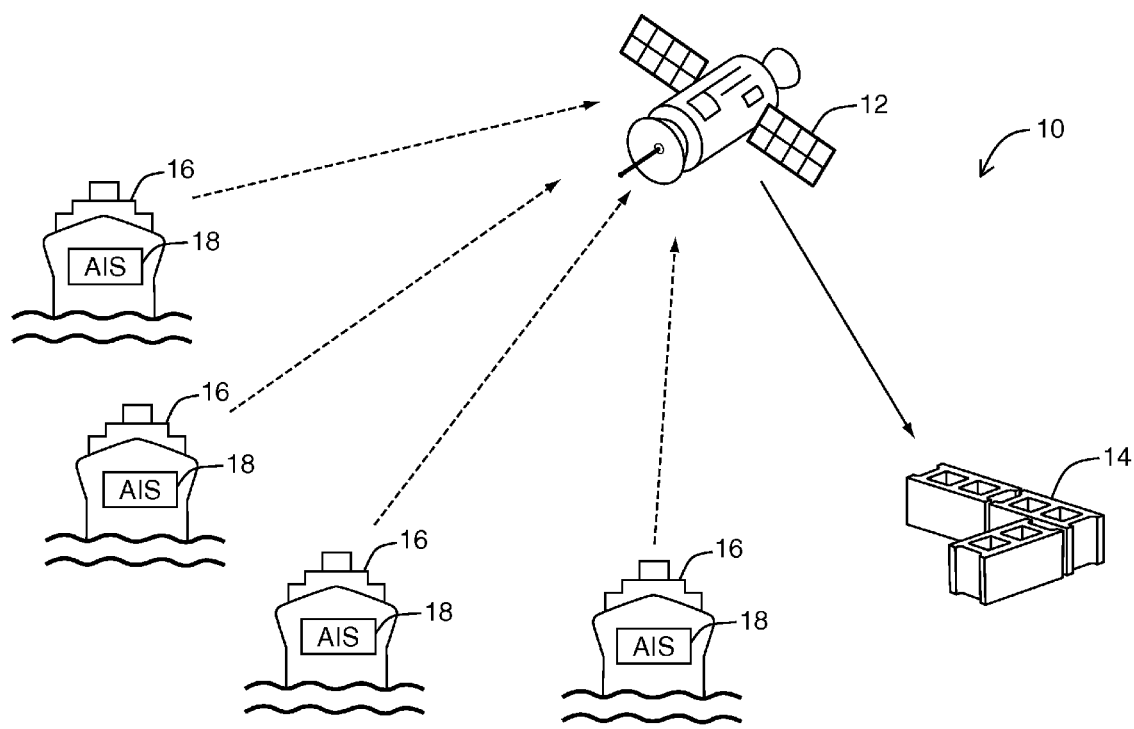
FIG. 1 is a schematic of an AIS processing system including a LEO satellite and a ground station.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

AIS signals can also be detected using low earth orbit (LEO) satellites. However, the large field of view (FOV) of a LEO satellite means that the LEO satellite may receive signals from a large number of ships at once, particularly as the LEO satellite passes over high volume shipping areas, which typically results in a large number of AIS signals colliding or overlapping with one another. Furthermore, the large FOV of a LEO satellite means that ships in the FOV may be very far from each other and at great distances the SOTDMA communication method is not effective at avoiding signal collisions. Propagation delays also affect accurate time synchronization.

Therefore, one problem encountered in LEO satellite-based AIS detection is that many of the AIS signals sent by ships will collide or overlap with one another. For example, it is estimated that there may be 2,000 ships in the FOV of a LEO satellite in high traffic areas. Each ship will typically send 10 AIS position reports per minute so for 2,000 ships a LEO satellite will receive 20,000 AIS signals per minute. This is a very large number compared to the number of available time slots (i.e. 4,500 across both VHF channels) and as a result many AIS signals will collide with one another. Therefore, although the detection of AIS signals by a LEO satellite can provide a means for monitoring a large region of shipping traffic, the viability of this approach is largely dependent on being able to decode AIS signals in the presence of a large number of overlapping signals.

A second problem encountered in LEO satellite-based AIS detection is that AIS signals received by a LEO satellite are subject to many sources of noise and interference in addition to possible collisions with other AIS signals. Such interference can prevent the detection of an AIS signal or produce errors in the decoded message. Due to the essentially random nature of these interference effects, the set of AIS message segments that is successfully decoded from any set of data is dependent on the parameter settings of the AIS receiver. Accordingly, almost any modification to the parameter settings of an AIS receiver will result in a modified set of extracted message segments for a given set of input data.

Accordingly, the performance (i.e. increase in the number of message segments decoded) of any AIS receiver may be enhanced by generating multiple versions of the original received AIS signal wherein each version corresponds to a particular set of receiver parameter settings. Each version of the AIS signal is then processed by a standard AIS receiver or receivers. The decoded message segments generated by the AIS receiver or receivers can then be combined to provide a final group of decoded message segments. Accordingly, embodiments described herein relate to methods and systems for extracting message segments from AIS signals received by a LEO satellite wherein multiple versions of the received AIS signal are generated and processed.

Reference is made to FIG. 1, which shows an AIS processing system 10 including a LEO satellite 12 and a ground station 14 for receiving and decoding AIS signals in accordance with an embodiment. FIG. 1 illustrates numerous ships 16 that have an AIS transponder 18 for transmitting AIS signals that are received by the LEO satellite 12.

Typically, a given ship 16 will transmit AIS signals over two narrowband (i.e. 25 kHz) VHF channels. Examples of AIS VHF channels include AIS1 at 161.975 MHz, AIS2 at 162.025 MHz, and USAIS at 157.375 MHz. To transmit the signal, the transmitting unit of the AIS transponder 18 employs a 9.6 kbps Gaussian minimum shift keying (GMSK) modulation, which is commonly known to imply that the AIS signal will be contained within a 14 kHz bandwidth. The LEO satellite 12 is equipped with at least one VHF antenna and receives the AIS signal transmitted by the ship 16. The LEO satellite 12 travels at a high velocity and consequently the AIS signal received by the LEO satellite 12 undergoes a Doppler shift. For example, a LEO satellite in a 700 km circular orbit travels at 7,500 m/s resulting in a Doppler shift of up to +/−3.64 kHz.

The AIS signals received by the LEO satellite 12 will have a range of amplitudes, depending on the location of the ship 16 and its angular position as seen by the LEO satellite 12. Generally, the transmitting antenna used in the AIS transponder 18 of a given ship 16 does not radiate directly upwards, and this creates a reception hole directly underneath the LEO satellite 12. However, for most of the FOV of the LEO satellite 12, the radiation patterns of the transmitting antenna of the AIS transponder 18 tend to balance the reduced signal strength caused by increased range, and the range of received signal amplitudes is relatively modest, and is most likely less than 10 dB for most of the FOV of the LEO satellite 12. Unfortunately, the amplitude differential between overlapping AIS signals has to be quite large for conventional decoding to succeed (>10 dB).

In some embodiments, the received AIS signals are processed at the LEO satellite 12 by an on-board decoder unit. Specifically, the on-board decoder unit generates multiple versions of all received AIS signals, and then decodes and extracts the message segments contained therein. The extracted message segments are then downlinked to the ground station 14. In other embodiments, the LEO satellite 12 pre-processes all of the received AIS signals to create digital input data, which is downlinked to the ground station 14 where the digital input data is processed by a decoder unit.

In alternative embodiments, there may be more than one LEO satellite 12 that receives and pre-processes, or detects and decodes, the AIS signals. In addition, or alternatively, one or more ground stations 14 may be used to decode the pre-processed AIS signals. In another alternative, the processing required for detection and decoding can be separated between the LEO satellite 12 and the ground station 14; this scheme can also be extended to the cases in which there is more than one LEO satellite 12 and one ground station 14, one LEO satellite 12 and more than one ground station 14, or more than one LEO satellite 12 and more than one ground station 14. Accordingly, in these cases, data can be transmitted between the LEO satellite(s) and ground station(s) for processing in a variety of fashions. For simplicity, the embodiments described herein are with regards to a system with one LEO satellite 12 and one ground station 14, but the processing methodology can be extended to several LEO satellites and/or several ground stations. It is also conceivable that inter-satellite links (ISL) amongst a constellation of LEO satellites could be employed. However, this is a very costly and complex approach, and, in practice, distribution of data via the terrestrial network is likely to be employed.

Figure 2:
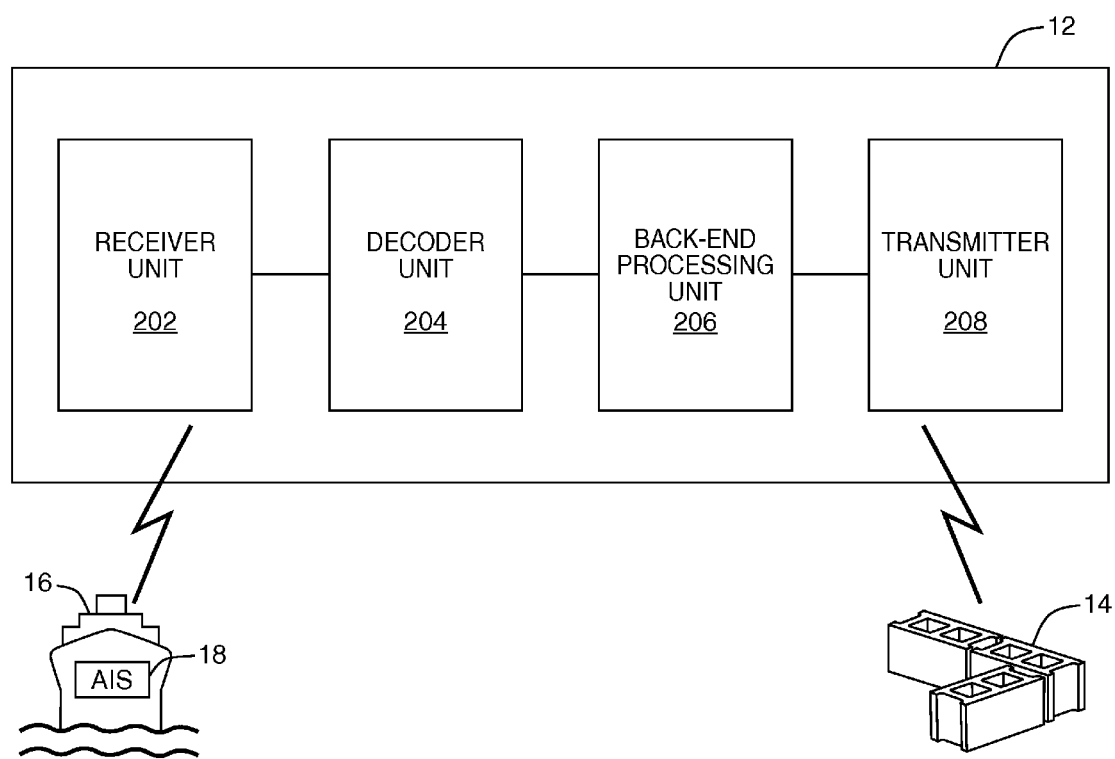
FIG. 2 is a block diagram of a LEO satellite in accordance with an embodiment.

Reference is now made to FIG. 2 wherein a block diagram of a LEO satellite 12 with an on-board decoder unit is illustrated. The LEO satellite 12 includes a receiver unit 202, a decoder unit 204, a back-end processing unit 206 and a transmitter unit 208.

The receiver unit 202 receives a plurality of AIS signals from the ships 16 and forwards them to the decoder unit 204 for decoding and extraction. Typically the receiver unit 202 includes one or more Very High Frequency (VHF) antennas (not shown) configured to receive AIS signals. In one embodiment each antenna is configured to receive AIS signals transmitted over AIS1, AIS2 and USAIS channels. In other embodiments, the antennas may be configured to receive AIS signals transmitted over the AIS1 and AIS2 channels and a dedicated Satellite AIS channel to be allocated. In some embodiments, the antennas are spatially separated from one another so that they receive different versions of the same signal. In other embodiments, the antennas are polarized in a different manner. For example, one antenna may have a right circular polarization, and another antenna may have a left circular polarization. Typically, the transmitter antenna of the AIS transponder 18 of a given ship 16 transmits AIS signals with a vertical linear polarization, which generally implies that transmissions from particular locations have fairly well defined polarizations. In embodiments with differently polarized antennas, this polarization manifests itself as a phase shift and possibly an amplitude shift between the AIS signals received by the multiple antennas.

In some embodiments, the receiver unit 202 pre-processes the received AIS signals before supplying them to the decoder unit 204. For example, the receiver unit 202 may convert the received AIS signals into baseband digital data signals prior to supplying them to the decoder unit 204. This conversion performed by the receiver unit 202 may be achieved in numerous ways and incorporates standard operations in signal processing.

The decoder unit 204 receives the AIS signals from the receiver unit 202 and processes the AIS signals to extract the message segments contained therein. The decoder unit 204 implements one or more of the methods described herein for extracting message segments from the AIS signals received by the LEO satellite receiver unit 202. Exemplary methods for extracting message segments from the AIS signals received by a LEO satellite will be described in reference to FIGS. 3, 5, 7 and 9. In each of the exemplary methods described below, multiple versions of the received AIS signals are generated and each version of the AIS signals is processed by an AIS receiver to extract the message segments contained therein. The resulting message segments are then combined to provide the final output data. By creating multiple versions of the received AIS signals, each corresponding to a different AIS receiver parameter, it is possible to increase the total number of extracted message segments. Exemplary decoder units 204 for implementing the described methods will be discussed in reference to FIGS. 4, 6, 8 and 10.

The back-end processing unit 206 receives the plurality of message segments extracted by the decoder unit 204, puts the message segments in time order and deletes any duplicate messages. Due to the fact that each of the methods processes multiple variants of the same AIS signal, many message segments will be detected multiple times. Accordingly, the message segments are sorted in time order so that any duplicates can be removed. As described above, the message segment of an AIS position report signal typically includes a time stamp that provides information on when the signal was generated. This time stamp, however, is not typically sufficient to accurately sort the message segments. Accordingly, the time sorting performed by the back-end processing unit 206 is typically based on the reception time of the signal as determined by the decoder unit 204.

The decoder unit 204 will typically have a time reference (i.e. clock) that may or may not be derived from GPS (Global Position System). Each message segment extracted by the decoder unit 204 will be tagged with a time stamp that indicates the time at which it was decoded. This will then facilitate sorting of the message segments by the back-end processing unit 206. Typically it is the AIS receiver itself that time stamps each of the message segments. Where there are multiple AIS receivers that operate in parallel, the time reference (i.e. clock) of each of the AIS receivers will typically be synchronized. Where there is only a single AIS receiver that processes multiple AIS signals (or multiple version of the same AIS signal) serially, the time stamp may be a measure of the delta from the start of the AIS signal, and the time reference (i.e. clock) may be reset each time a new AIS signal (or a new version of the AIS signal) is processed.

Since the decoded or extracted message segments may include classified information that must be kept secure, encryption can also be employed by the back-end processing unit 206 prior to supplying the sorted and filtered message segments to the transmitter unit 208. In these cases, the back-end processing unit 206 may include an encryption module (not shown) for encrypting the sorted and filtered message segments.

The back end-processing unit 206 may be implemented in software on a personal computer or on a dedicated processor.

The transmitter unit 208 receives the sorted and filtered message segments from the back-end processing unit 206 and transmits them or downlinks them to the ground station 14. The transmitter unit 208 typically includes a modulator (not shown), a transmitter (not shown) and a transmitter antenna (not shown). The modulator modulates the message segments onto a carrier signal for transmission to the ground station 14. The modulator may employ various modulation techniques, such as phase-shift keying (PSK) which modulates the message segment data onto the carrier in such a way that the sequence of zeros and ones making up the message segments is represented by phase shifts in the carrier signal. Examples of suitable PSK techniques include quadrature PSK or a higher-order PSK such as 8-PSK. Quadrature PSK uses four possible phase values and can therefore transmit two bits of data per symbol on the carrier. 8-PSK uses eight phase values and thus can transmit three bits of data per symbol on the carrier.

The modulator may be implemented by digital or analog circuits. In a digital implementation, the modulations are typically performed in the digital domain with a constellation mapper. The output of the constellation mapper may then be passed through a digital pulse shaping filter followed by a digital to analog converter to convert the digital modulated signal to an analog modulated signal for further processing.

To reduce the transmission errors between the LEO satellite 12 and the ground station 14, the modulator may be configured to implement forward error correction (FEC), using, for example, Reed-Solomon codes, convolutional codes, Turbo codes, or Low Density Parity Check codes. Forward error correction is where redundant data, also known as an error-correction code, is added to a message prior to transmission. This allows the receiver to detect and correct errors without the need to ask the sender for additional data.

The modulated signal(s) are then received by the transmitter which up-converts them to the frequency range required for transmission, and amplifies these signals so that they have the required signal strength needed for transmission to the ground station 14. The transmitter may also include an output filter to limit the out of band signals generated by the amplification to control the potential interference with users in nearby frequency bands.

Figure 3:
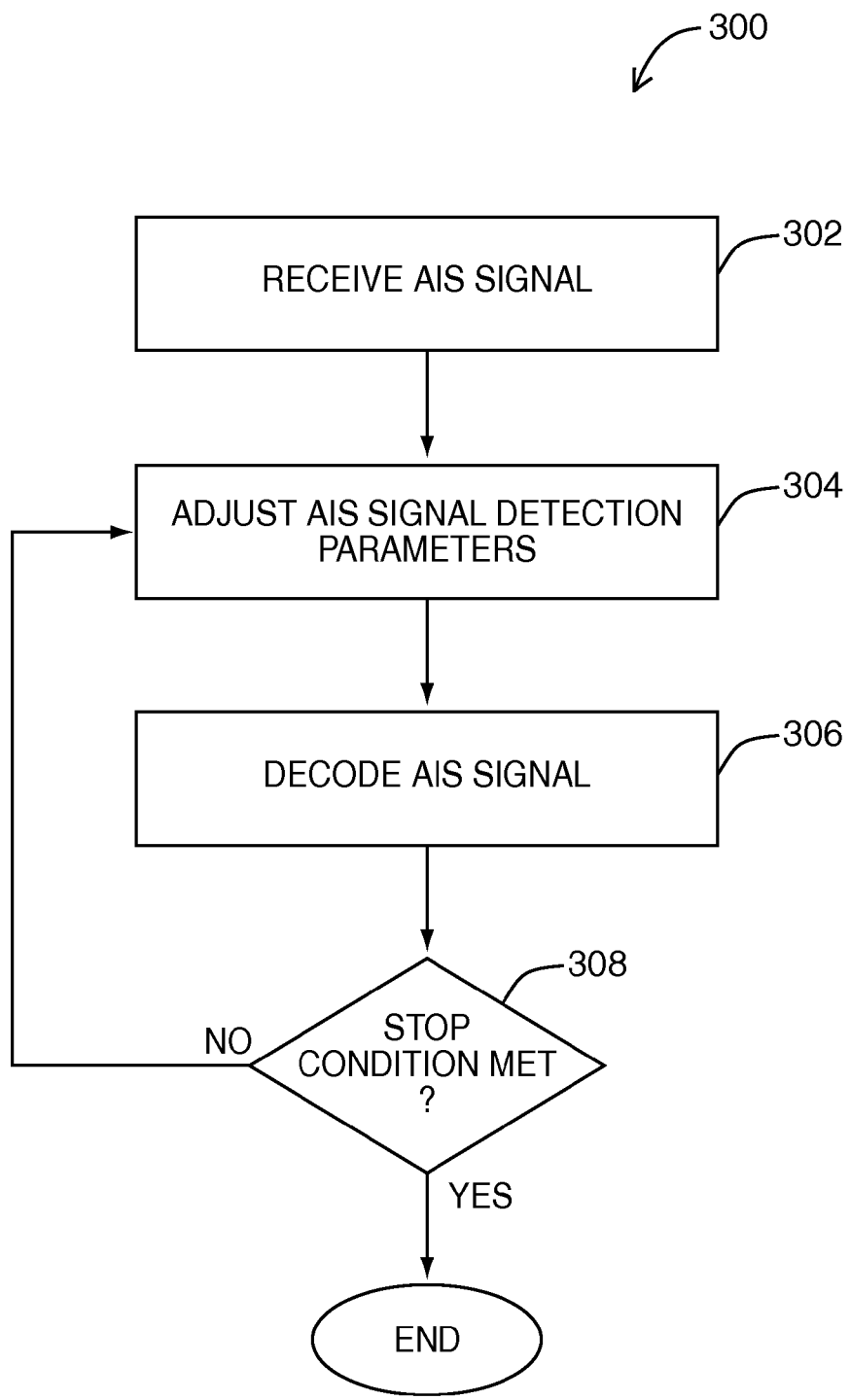
FIG. 3 is a flowchart of a method for extracting message segments from AIS signals received by a LEO satellite in accordance with a first embodiment.

Reference is now made to FIG. 3, wherein a flowchart of a method 300 for extracting message segments from AIS signals received by a LEO satellite in accordance with a first embodiment is illustrated. This method relies on chance variations in the detection process to improve the number of message segments extracted from the received AIS signals. The AIS signals received by a LEO satellite are typically contaminated by a variety of noise and interference processes, as well as by other overlapping AIS transmissions. These effects in general reduce the probability of successfully decoding the message segment. The probability of decoding a particular message segment is however dependent on the parameter settings of the AIS receiver relative to the AIS signal variations. Typically, the most appropriate settings for a particular AIS signal cannot be determined in advance.

When a signal is received for processing, one of the most important quality parameters of the signal is the signal to noise ratio (SNR) which is the ratio of the power of the signal to the noise power from the transmitter, the propagation path and the receiving circuitry. In addition to the noise, interference from the propagation path (i.e. colliding signals) and spurious interference generated by the receiver and other equipment on the satellite will also directly affect the AIS signal detection. The total impact from noise and interferences is typically described by a signal to noise plus interference ratio (SNIR). The SNIR is equal to the power of the signal divided by the sum of the power of the noise and the power of the interference. Reliable decoding requires some signal level margin relative to the levels of noise and interference, therefore, most AIS receivers have a signal to noise plus interference threshold. When the level of the received signal drops below this threshold, then the number of decoding errors increases rapidly. Accordingly, when the quality of the received signal is close to the AIS receiver signal to noise plus interference threshold the success or failure in detecting a message segment is especially sensitive to the AIS receiver settings.

Accordingly, the number of message segments extracted from the received AIS signals can be improved by processing the same AIS signal multiple times, each time with different parameter settings. The AIS receiver parameters, including RF (radio frequency) and DSP (digital signal processor) parameters, or signal parameters, or both may be varied in a systematic or random manner. The AIS receiver parameters and the AIS signal parameters will collectively be referred to herein as the AIS signal detection parameters.

At (302), an AIS signal is received from the receiver unit 202. In some embodiments, the AIS signal is repeatedly processed through a single AIS receiver, each time with a different set of AIS signal detection parameters. In these embodiments, the received signal is typically digitized and stored in a memory module for use in subsequent iterations of the method 300. In other embodiments, the AIS signal is concurrently processed by a plurality of AIS receivers, each with a different set of AIS signal detection parameters. In these embodiments, the AIS signal may be directly forwarded to the AIS receivers for processing without first storing the AIS signal in a memory module. Once the AIS signal is received, the method proceeds to (304).

At (304), one or more AIS signal detection parameters are adjusted. As described above, the AIS signal detection parameters include the parameters of the AIS signal itself, such as frequency and amplitude (level), and the parameters of the AIS receiver used to decode the AIS signal.

The particular AIS receiver parameters that can be adjusted are based on the specific AIS receiver used to decode the received AIS signal. Most AIS receivers include an internal bandpass filter that filters the input signal prior to processing. Typically, the centre frequency, bandwidth, and frequency response of the filter are adjustable. In some embodiments, the centre frequency is varied over the expected range of possible Doppler shifts in the received AIS signals. As described above, the LEO satellite 12 travels at a high velocity, such as 7,500 m/s for example, and consequently the AIS signals received by the LEO satellite 12 typically undergo Doppler shifts of up to +/−3.64 kHz. An adjustment to the filter centre frequency essentially has the same effect as adjusting the frequency of the AIS signal itself. Accordingly, only one of these adjustments is typically made per iteration of the method.

In some embodiments, the bandwidth of the internal filter is varied between the minimum bandwidth required to decode an AIS signal (e.g. 9 kHz) and the bandwidth of a full channel (e.g. 25 kHz). Typically, the frequency response of the internal filter matches the spectrum of the AIS signal. However, in some embodiments, the frequency response may be adjusted to account for fading at particular frequencies.

Some AIS receivers also allow adjustment of the detection threshold, which can be described as the comparison value used at the symbol detection stage. The symbol detection stage can be described as an inverse operation to the modulation. The AIS receiver typically performs carrier and timing recoveries on the signal, and then demodulates the signal to a baseband form. At baseband, each symbol or a set of symbols is decoded by comparing the "target function" of the waveform against the detection threshold. The "target function" of the waveform, may be, for example, the waveform amplitude, the integrated power over the symbol period, or the mean square errors between the waveform and the symbol pattern under test. The determination of what symbols correspond to what bits or bit combinations is typically based on whether or not the "target function" of the waveform is above or below the detection threshold. Accordingly, adjusting the detection threshold changes the probabilities of missing a detection and making a false detection. Where the "target function" is the waveform amplitude, the detection threshold may be varied over the amplitude range of the AIS signals to achieve certain performance such as constant false alarm rate (CFAR).

In some embodiments, the AIS signal detection parameters are adjusted in a fixed or predetermined manner. For example, there may be a predetermined list of AIS signal detection parameter sets that are sequentially applied. In other embodiments, the AIS signal detection parameters may be adjusted on an adaptive basis. For example, the parameters to be adjusted and their values may be selected based on the number of message segments extracted using the previous parameter values.

Once the one or more parameters have been adjusted, the method 300 proceeds to (306).

At (306) the AIS signal is decoded by an AIS receiver using the parameter set defined in (304). The decoding process typically involves conditioning the received AIS signal in accordance with AIS signal detection parameters defined in (304), and extracting the plurality of message segments contained within the AIS signal using an AIS receiver. Once the message segments have been extracted, the method 300 proceeds to (308).

At (308) it is determined whether at least one stop condition is met. If at least one stop condition is met, then the method ends. If none of the stop conditions are met then the method proceeds back to (304) where the AIS signal detection parameters are adjusted again.

As described above, the AIS signal detection parameters may be adjusted in a predetermined manner, or they may be adjusted on an adaptive basis. Where the AIS signal detection parameters are adjusted in a predetermined manner, the stop condition may be that all of the parameter sets have been used or tested. Where, however, the AIS signal detection parameters are adjusted on a dynamic basis, a stop condition may be satisfied when (i) a predetermined number of parameter sets have been used or tested; or (ii) certain performance related criterion is met (e.g. the number of new message segments extracted drops below a predetermined threshold).

Figure 4:
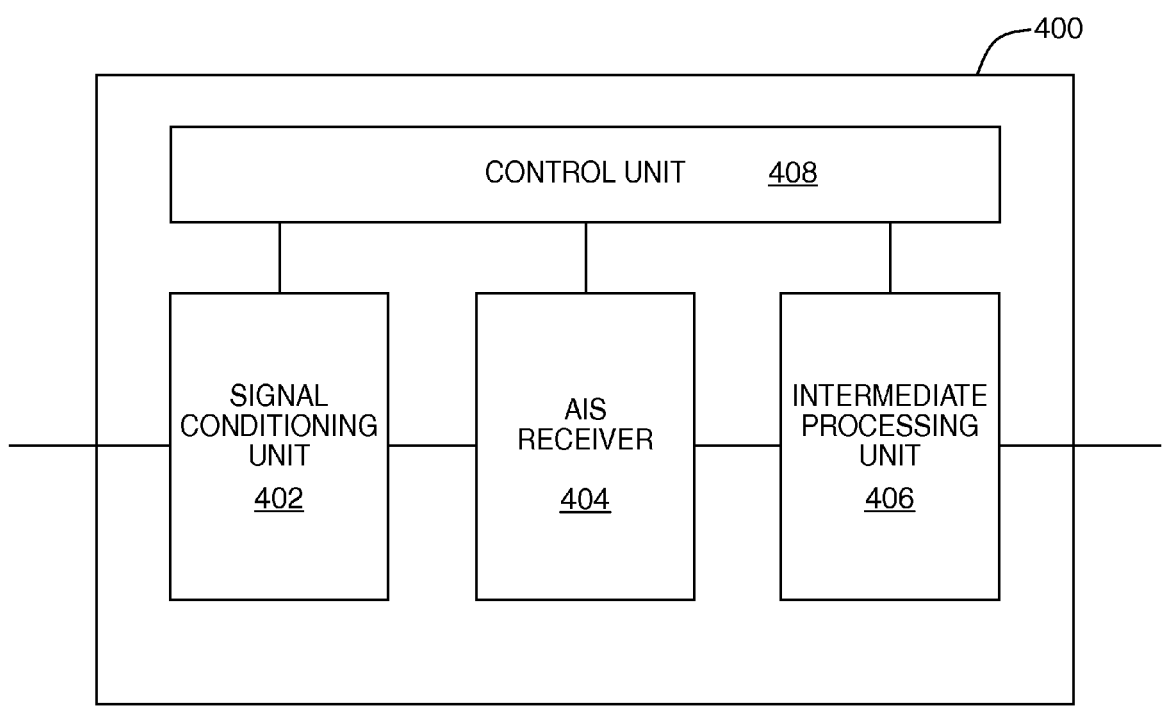
FIG. 4 is a block diagram of an exemplary decoder unit for implementing the method of FIG. 3.

Reference is now made to FIG. 4, wherein a block diagram of an exemplary decoder unit 400 for implementing the method 300 of FIG. 3 is illustrated. The decoder unit 400 includes a signal-conditioning unit 402, an AIS receiver 404, an intermediate processing unit 406, and a control unit 408.

The signal-conditioning unit 402 receives an AIS signal from the receiver unit 202 and conditions or modifies the received AIS signal prior to providing it to the AIS receiver 404. The signal output by the signal-conditioning unit 402 will be referred to as the conditioned AIS signal. In some embodiments, the signal-conditioning unit 402 can alter the frequency and amplitude (level) of the AIS signal. In other embodiments, the signal-conditioning unit 402 can also modify the noise, phase and timing of the AIS signal.

The signal-conditioning unit 402 may be implemented using analog or digital components, depending on whether the received AIS signal is in digital or analog form. For example, where the received AIS signal is in analog form, the signal-conditioning unit 402 may include a mixer with a tunable local oscillator (LO) for converting the received AIS signal to a different center frequency; and one or more amplifiers or attenuators for adjusting the power level of the AIS signal. Where, however, the received AIS signal is in digital form, frequency adjustment may be made by a numerically controlled oscillator (NCO); and the power level adjustment may be implemented using a digital scaling operation. It will be evident to an ordinary person of skill in the art that these are example implementations only, and that the signal-conditioning unit 402 may be implemented using other components or techniques.

In some embodiments, the signal-conditioning unit 402 performs the AIS signal conditioning in accordance with a control signal generated by the control unit 408. For example, the control unit 408 may generate a signal-conditioning control signal that dictates which signal parameters (i.e. frequency and amplitude (level)) should be adjusted or modified by the signal-conditioning unit 402. In some embodiments, the signal-conditioning control signal is varied once each iteration so that each time the signal is passed through the signal-conditioning unit 402 different signal parameters are adjusted or modified. However, in other embodiments the control signal may be varied more or less often. For example, the signal-conditioning signal may only be varied once every second iteration, or may stay the same throughout the decoding process.

In other embodiments, the signal-conditioning unit 402 is pre-programmed with a fixed number of signal parameter adjustments and the signal-conditioning unit 402 sequentially executes the signal parameter adjustments.

The AIS receiver 404 receives the conditioned AIS signal from the signal-conditioning unit 402 and extracts one or more message segments contained therein. The AIS receiver 404 may be a standard receiver, such as the EURONAV™ AI3000 or the Smart Radio Holdings Limited™ SR162 Professional AIS Receiver; or a proprietary receiver, such as that described in U.S. Published Patent Application No. 2008/0304597 to Peach.

In some embodiments, the AIS receiver 404 extracts the one or more message segments in accordance with an AIS receiver control signal generated by the control unit 408. For example, the AIS receiver control signal may specify the receiver parameter (i.e. filter center frequency, filter bandwidth, filter frequency response and detection threshold) values to be used by the AIS receiver 404 in extracting the message segments. In some embodiments, the AIS receiver control signal is varied once each iteration so that each time the conditioned AIS signal is passed through the AIS receiver 404 a different set of receiver parameter values is used. However, in other embodiments the control signal may be varied more or less often.

In other embodiments, the AIS receiver 404 is pre-programmed with a fixed number of AIS receiver parameter sets and the AIS receiver 404 sequentially applies the AIS receiver parameter sets. In these embodiments, the AIS receiver 404 would typically receive a timing control signal from the control unit 408 that would notify the AIS receiver 404 when to switch to the next set of receiver parameters.

In still other embodiments, the AIS receiver parameter values may be partially pre-programmed in the AIS receiver 404 and may be partially dictated by the AIS receiver control signal. For example, an initial set of receiver parameter values may be loaded into the AIS receiver 404 and the AIS receiver control signal may provide only changes to the preconfigured AIS receiver parameter values. As described above, in reference to FIG. 3, the particular AIS receiver parameters that can be adjusted are based on the specific AIS receiver 404 and may include the filter center frequency, the filter bandwidth, the filter frequency response and the detection threshold.

The intermediate processing unit 406 receives the message segments extracted by the AIS receiver 404 and pre-processes them. In some embodiments, the pre-processing simply involves counting the number of message segments and storing them in a memory module (not shown) of the intermediate processing unit 406. This simple processing is typically implemented where a fixed, pre-defined number of parameter sets are applied to the signal conditioning unit 402 and the AIS receiver 404.

In other embodiments, the intermediate processing unit 406 may also delete any repeated messages. This may be accomplished by appending the new message segments to the previously extracted message segments, sorting the message segments in chronological order, and deleting (or filtering out) any duplicate message segments. The filtered list of message segments may then be stored in a memory module (not shown) of the intermediate processing unit 406. Through the sorting and deletion process, the intermediate processing unit 406 may also determine how many of the received message segments are new (i.e. have not been extracted in a previous iteration of the method). The intermediate processing unit 406 may then provide this information to the control unit 408.

Typically, the intermediate processing unit 406 stores the list of message segments until it receives a signal from the control unit 408 to export the extracted message segments to the back-end processing unit 206. The intermediate processing unit 406 may be implemented on a personal computer or a dedicated processor.

The control unit 408 controls the operation of the signal-conditioning unit 402, the AIS receiver 404, and the intermediate processing unit 406. Specifically, in one embodiment, the control unit 408 generates signal conditioning and AIS receiver control signals for the signal-conditioning unit 402 and the AIS receiver 404 respectively which dictate the parameter values to be used by the respective units. For example, the signal conditioning control signal may indicate whether the frequency or amplitude (level) of the AIS signal should be adjusted by the signal-conditioning unit 402 and by how much. The AIS receiver control signal, on the other hand, may specify values for all of the adjustable parameters of the AIS receiver 404 or may only specify a specific parameter or parameters to be adjusted and by how much. In some embodiments, at the start of each iteration, the control unit 408 modifies at least one of the AIS signal detection parameter values and incidentally at least one of the control signals.

In some embodiments, the control unit 408 modifies the AIS signal detection parameter values in a predetermined fashion. For example, the control unit 408 may be configured with a list of parameter sets and the control unit 408 may sequentially work through the parameter sets on the list until either (i) all of the parameter sets have been exhausted; or (ii) when the number of new message segments extracted falls below a predetermined threshold. In other embodiments, the control unit 408 may modify the parameter values in an adaptive manner. For example, the control unit 408 may receive information from the intermediate processing unit 406 on how many message segments were extracted using a particular set of parameters and may increase the number of parameter values in the vicinity of a high number and decrease the number of values in the vicinity of a low number.

Generally particular parameters will be able to take (or be set to) specific ranges of values. If particular values of a given parameter are successful in extracting new message segments, then additional values in this region may be used. Conversely, if particular values are unsuccessful (e.g. they don't produce a high number of message segments), then the number of values used in this region may be reduced. In some cases, if variations of a particular parameter are found to have little effect on the number of successful decodes then the parameter may be fixed or restricted to a single value only.

In both embodiments, one or more AIS signal detection parameter values may be modified on each iteration. In an adaptive system, it is likely that multiple AIS signal detection parameters would be varied at each iteration. However, due to the limited resources typically available on LEO satellites, it is important to focus on the most significant AIS signal detection parameters (i.e. those parameters that will have the most effect on the AIS signal detection). The most significant parameters typically include frequency shift, filter bandwidth, and signal amplitude (level).

The control unit 408 also typically controls the intermediate processing unit 406 via a control signal. In one embodiment, the control unit 408 determines if one or more predetermined stop conditions are met based on the information received from the intermediate processing unit 406. If one or more predetermined stop conditions are met, the control unit 408 sends a control signal to the intermediate processing unit 406 to pass all of the extracted message segments to the back-end processing unit 206. However, if none of the predetermined stop conditions are met, then the control unit 408 notifies the signal-conditioning unit 402 to further process the AIS signal.

As described above, where the AIS signal detection parameters are adjusted in a predetermined manner, the stop condition may be that all of the predetermined parameter sets have been applied. Where, however, the AIS signal detection parameter values are adjusted on a dynamic basis, a stop condition may be satisfied when (i) a predetermined number of parameter sets have been used or tested; or (ii) certain performance related criterion is met (e.g. the number of new message segments extracted drops below a predetermined threshold).

The control unit 408 may be implemented on a personal computer or a dedicated processor.

Figure 5:
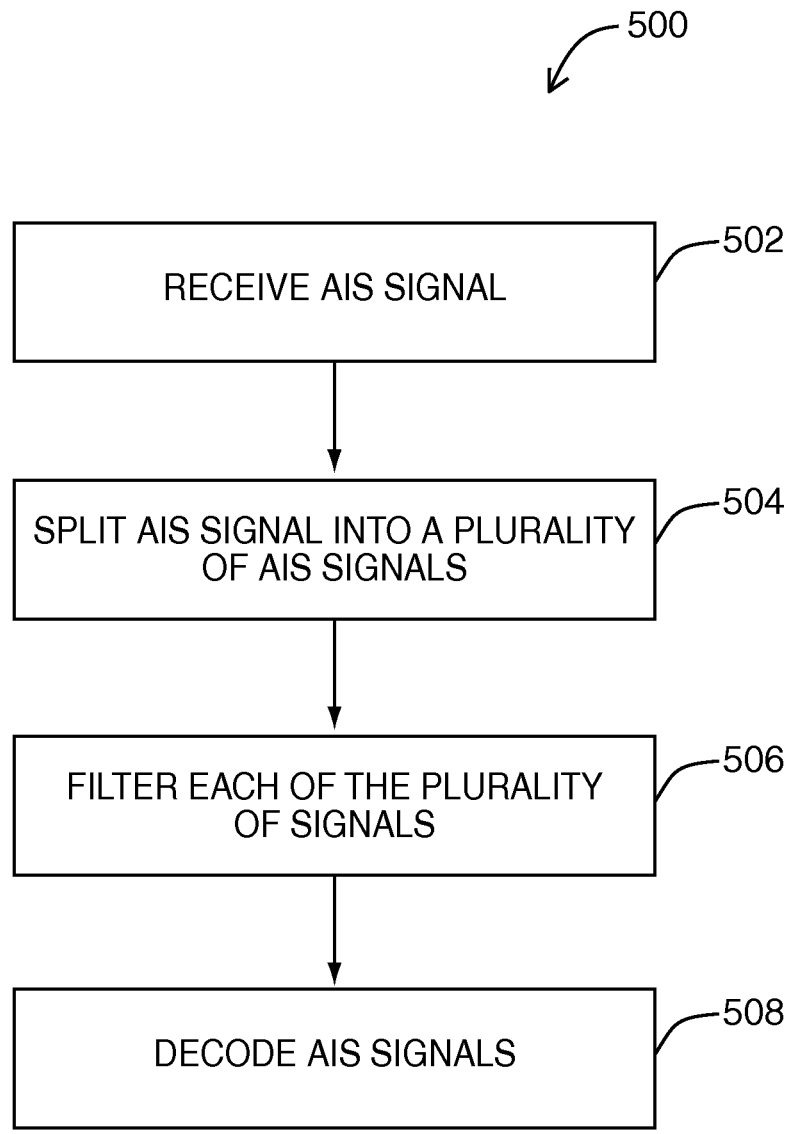
FIG. 5 is a flowchart of a method for extracting message segments from AIS signals received by a LEO satellite in accordance with a second embodiment.

Reference is now made to FIG. 5, wherein a flowchart of a method 500 for extracting message segments from AIS signals received by a LEO satellite in accordance with a second embodiment is illustrated. This embodiment involves passing the received AIS signals through a filter bank wherein each bandpass filter of the filter bank is configured for a different frequency band. In some embodiments, such as that shown in FIG. 6, the output of each filter is passed to a separate AIS receiver for processing. In other embodiments, the outputs are stored and sequentially passed through a single AIS receiver for processing. This method 500 makes it possible to restrict the signal bandwidth seen by each AIS receiver while still capturing all of the possible signals.

At (502) an AIS signal is received from the receiver unit 202. Once the signal has been received, the method 500 proceeds to (504).

At (504) the AIS signal received at (502) is split or divided into a plurality of equivalent AIS signals. Once the AIS signal has been split or divided into a plurality of equivalent AIS signals, the method 500 proceeds to (506).

At (506), each of the equivalent signals is filtered in parallel by a separate and distinct bandpass filter to produce a plurality of filtered AIS signals. The bandpass filters are configured to overlap by an amount at least equal to the minimum bandwidth required for a successful decode. This ensures that at least one of the bandpass filters will produce a signal that can be detected by an AIS receiver. While the effective bandwidth of an AIS GMSK signal is approximately 14 kHz, the inventors have observed that the full 14 KHz is not required for a successful decode. Typically, the central 9-10 kHz will suffice. Placing a filter of this bandwidth in front of an AIS receiver does not typically affect the decode, but it will block the greatest possible amount of spectral energy from interfering signals.

In one embodiment, the bandwidth of the filters is selected to achieve the highest reduction in bandwidth with a modest number of filters. In some cases, the bandwidth of the filters and the number of filters are selected using equation (1) where $B_D$ is the minimum bandwidth required for a successful decode, B is the bandwidth of each individual filter, $B_C$ is the channel bandwidth and N is the number of filters.

$$B_C = B + (N-1)*(B - B_D) = N*B - (N-1)*B_D \quad (1)$$

As described above, the minimum required bandwidth for a successful decode $B_D$ is 9-10 kHz and the channel bandwidth $B_C$ is 24 kHz. For the following calculations the minimum required bandwidth for a successful decode $B_D$ is set to 10 kHz. The bandwidth B of each filter must be greater than the minimum bandwidth required for a successful decode $B_D$ and is typically less than or equal to the bandwidth of a standard AIS receiver (i.e. 25 kHz). While the bandwidth B of each filter may be greater than 25 kHz, if the bandwidth B of each filter is greater than 25 kHz, the filter bank would not provide any benefit since the AIS receiver would reduce the bandwidth more than the filter bank.

Using equation (1), if the bandwidth B of each filter is selected to be 12 kHz, then N is equal to seven. Therefore seven filters would cover the 24 kHz bandwidth. However, if the bandwidth B of each filter were reduced to 11 kHz, then N would be equal to thirteen. An examination of equation (1) reveals that the number of filters would approach infinity if the bandwidth B of each filter approached the minimum bandwidth for a successful download $B_D$. Accordingly, the effect of the filter bandwidth on the number of filters should be carefully considered when selecting the filter bandwidth.

After the equivalent AIS signals have been filtered, the method 500 proceeds to (508).

At (508) each of the filtered signals is decoded by an AIS receiver to produce a plurality of message segments. In some embodiments, each filtered signal is processed or decoded in parallel by a separate AIS receiver. In other embodiments, the filtered signal data is saved and sequentially processed or decoded by a single AIS receiver.

Figure 6:
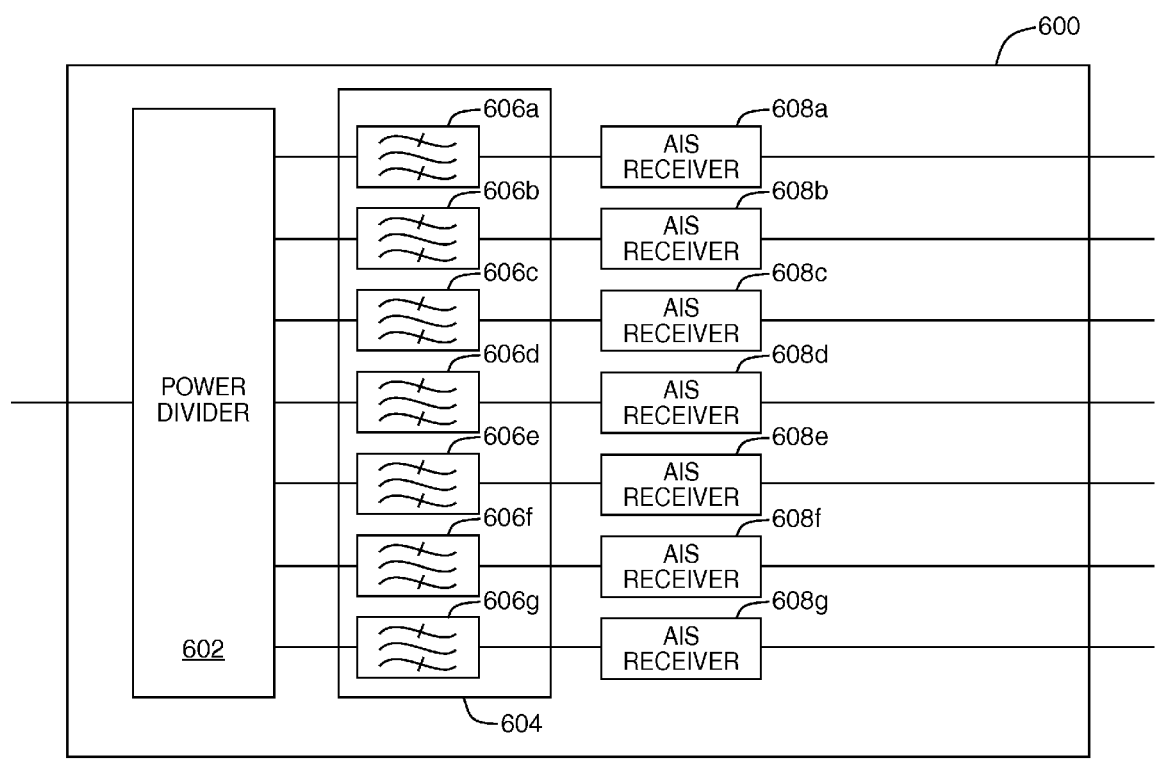
FIG. 6 is a block diagram of an exemplary decoder unit for implementing the method of FIG. 5.

Reference is now made to FIG. 6, wherein a block diagram of a decoder unit 600 for implementing the method 500 of FIG. 5 is illustrated. The decoder unit 600 includes a power divider 602, a filter bank 604 comprised of a plurality of bandpass filters 606a to 606g, and a plurality of AIS receivers 608a to 608g.

The power divider 602 receives the AIS signal from the receiver unit 202 (which typically includes a low noise amplifier) and splits the received AIS signal into a plurality of equivalent signals. Each equivalent AIS signal is fed to one bandpass filter 606a to 606g of the filter bank 604. Power dividers are well-known in the art and may be implemented in a variety of ways. In one embodiment, the power divider 602 is implemented using a standard RF power splitter. However, it would be evident to a person of skill in the art that the power divider 602 may be implemented using other components or techniques.

Each filter 606a to 606g of the filter bank 604 receives one of the equivalent AIS signals from the power divider 602 and filters the received AIS signal to produce a corresponding filtered AIS signal. The bandwidth of each filter 606a to 606g and the number of filters may be selected in accordance with the methods described in reference to FIG. 5 (e.g. by using equation (1)).

The filter bank 604 may be implemented in analog or digital form depending on the format of the received AIS signal. For example, when the received AIS signal is in digital form, the filter bank 604 may be implemented using a bank of discrete digital filters, polyphase FFT (Fast-Fourier Transform) based filter banks or simple FFT-based filters.

Each AIS receiver 608a to 608g receives one filtered AIS signal produced by one of the bandpass filters 606a to 606g and extracts the message segments contained therein. Each AIS receiver 608a to 608g may be a standard receiver, such as the EURONAV™ AI3000 or the Smart Radio Holdings Limited™ SR162 Professional AIS Receiver; or a proprietary receiver, such as that described in U.S. Published Patent Application No. 2008/0304597 to Peach.

Figure 7:
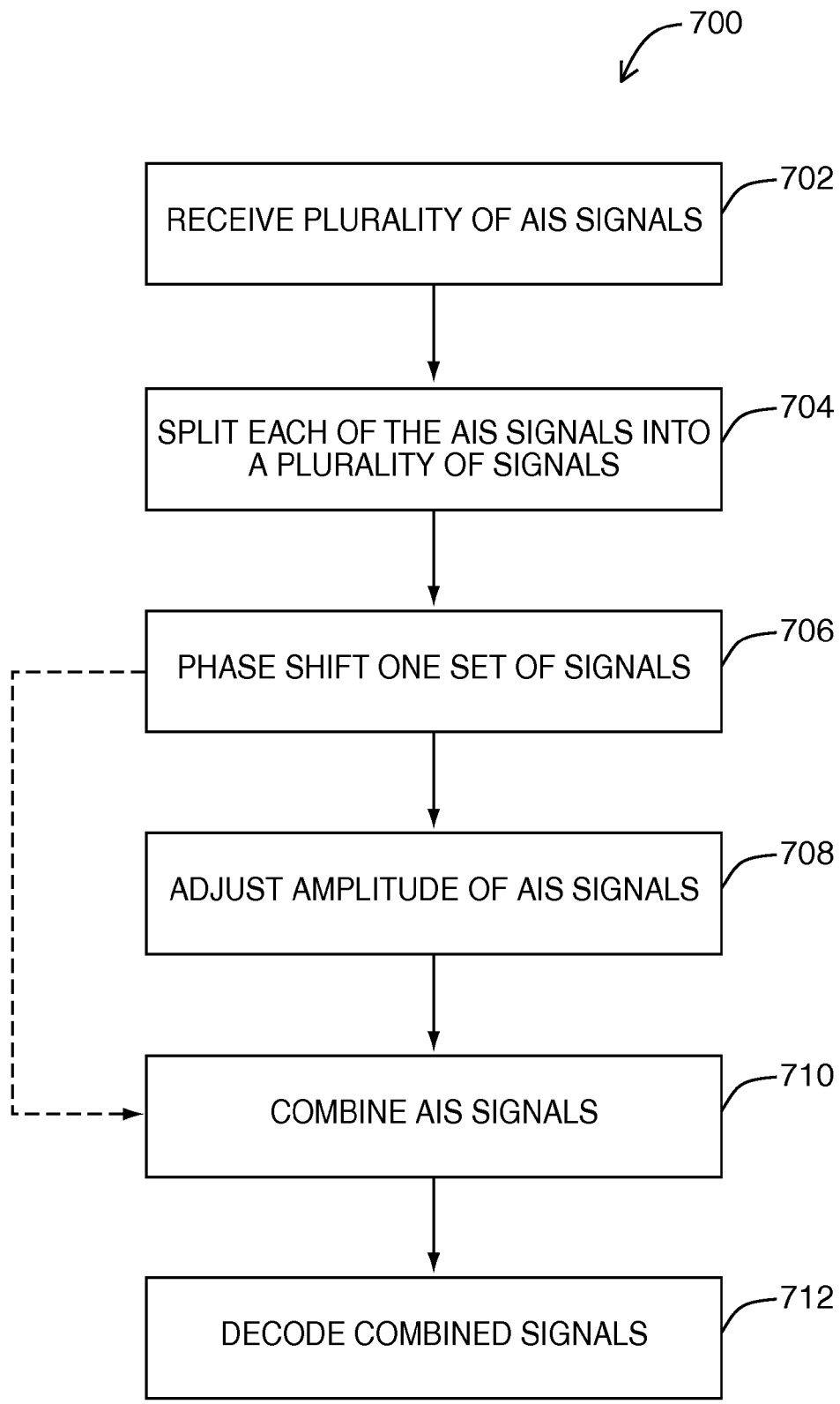
FIG. 7 is a flowchart of a method for extracting message segments from AIS signals received by a LEO satellite in accordance with a third embodiment.

Reference is now made to FIG. 7, wherein a flowchart of a method 700 for extracting message segments from AIS signals received by an LEO satellite in accordance with a third embodiment is illustrated. In this embodiment, multiple AIS signals are received by a plurality of antennas and then combined prior to processing by one or more AIS receivers. In theory, all AIS signals should be received by each antenna, but the different AIS signals will have different amplitudes and phases when received by the different antennas. This allows linear combinations of the received signals to be chosen that will cancel certain AIS signals while preserving others. Specifically, combinations of the signals with controlled phase shifts will form new composite beams which will favor signals from some directions, while attenuating signals from other directions.

At (702) a plurality of AIS signals is received from the receiver unit 202. In one embodiment, two AIS signals are received from two different antennas of the receiver unit 202. The two AIS signals will be referred to as the first and second AIS signals. Once the plurality of signals has been received, the method 700 proceeds to (704).

At (704) each of the AIS signals received at (702) is split or divided into a predetermined number of equivalent AIS signals. For example, where there are two AIS signals, and the predetermined number of equivalent AIS signals is 4, the first and second AIS signals are both split into 4 equivalent AIS signals. Once the AIS signals have been split or divided into a plurality of equivalent AIS signals, the method 700 proceeds to (706).

At (706), each AIS signal of one set of equivalent AIS signals is phase shifted by a different amount to produce a plurality of phase shifted AIS signals. For example, where there are two AIS signals, and each signal is divided into four equivalent AIS signals, each of the four equivalent AIS signals corresponding to one of the received AIS signals (e.g. the second AIS signal) is phase shifted by a different amount.

In principle, if the particular location from which a signal was transmitted is known, it is possible to predict the amplitude and phase of the signals received by each of the antennas. Based on such analysis, it is then possible to choose linear combinations of the signals received by the plurality of antennas that discriminate against particular locations and favor other locations. However, such analysis is complex and does not typically produce significantly better results than combining the received AIS signals in a number of fixed combinations. This is especially true when the composite beams formed by the set of fixed combinations cover the entire area of interest.

Accordingly, in the embodiments described herein a fixed or predetermined number of phase shifts are applied. In some embodiments, not only is the number of phase shifts predetermined, but also the amount of each phase shift is predetermined. For example, in one embodiment phase shifts of 0°, 90°, 180° and 270° are applied. In this embodiment, one of the phase shifts will be within 45° of the ideal phase shift. In another embodiment, phase shifts of 0°, 45°, 90°, 135°, 180°, 225°, 270° and 315° are applied. In this embodiment, one of the phase shifts will be within 22.5° of the ideal phase shift. The main advantage of using a fixed set of combinations is that one of the combinations will likely be fairly close to the optimal value without the need for any a priori knowledge about the original AIS signal. The main disadvantage, however, is the extra processing power required to decode multiple signals.

In other embodiments, the phase shifts are adaptively or dynamically selected. For example, the number of message segments produced by each phase combination may be monitored and the phase shifts may be selected to favor those phase shifts that produce more message segments. In some embodiments, in the absence of other information, the phase shifts are initially selected to be uniformly spaced (e.g. if there are four phase shifts they may be selected to be 0°, 90°, 180° and 270°). The number of message segments produced by these phase shifts may then be monitored and the number of phase shifts may be increased in a successful region and decreased in the less successful regions.

For example, in one embodiment, each phase shift is considered to be at the center of a sector. In the 4-phase shift example above, each sector would start off with an angle of 90°. The size of each sector would then be inversely adjusted based on the number of message segments produced by each phase shift, up to a certain maximum value (e.g. 180°). There may also be additional constraints that the sum of the sector angles must be 360°, and one of the new phase shifts must lie at the center of the most successful of the previous sectors.

The actual operation also typically depends on the arrangement of the antennas in the receiver unit 202. If the antennas are installed along a line, each phase shift associated with a beam produced by a specific combination will point to a certain angle along the installation line. Accordingly, a set of phase shifts will form a set of beams pointing to a set of angles along the line with good overlaps. If there is a particular beam that receives a high number of AIS signals (e.g. there a lot of ships that fall under that beam) and a low message segment extraction rate, the beam can be moved away by an offset to reduce the number of ships covered by the beam and increase the message segment extraction rate. If, however, the antennas are installed along different dimensions, there is more flexibility in adjusting the beam pointing by phase shifting. Combinations of different orientations and polarization of the antennas will further create varieties of composite beam characteristics.

After the phase shifts have been applied to one set of equivalent AIS signals, the method 700 may proceed to (708) or (710) depending on whether the amplitudes of the AIS signals are to be modified prior to combining the signals. If the amplitudes of the AIS signals are to be modified, then the method 700 proceeds to (708). Otherwise, the method proceeds to (710).

For example, where the receiver unit 202 has two linearly polarized antennas at right angles to each other, the amplitudes of the signals received by the two antennas will typically be $\cos(\phi)$ and $\sin(\phi)$ where $\phi$ is the angle between the first antenna and the plane of polarization of the AIS signal. In this case, the amplitudes of each pair of AIS signals may be adjusted to be $\cos(\theta)$ and $\sin(\theta)$ where $\theta$ is varied in four 45° steps or eight 22.5° steps, depending on the number of outputs from the power combiners. Specifically, a particular value of $\theta$ would be applied to each pair of outputs from the power combiners. Generally the variation of $\theta$ over a 180° range (as opposed to a 360° range) is sufficient, because an angle of θ+180° corresponds to the same polarization orientation as θ, with only a trivial reversal of sign.

Where, however, receiver unit 202 has two circularly polarized antennas, the amplitudes of the signals received by the two antennas will typically be similar.

Accordingly, in this case there is typically no adjustment of the AIS signal amplitudes and the method 700 proceeds directly to (710).

At (708), the amplitudes of one or more of the equivalent AIS signals and phase shifted AIS signals are modified to maximize the cancellation of unwanted signals when the signals are combined. For example, as described above, where the receiver unit 202 has two linearly polarized antennas, the amplitudes of each pair of AIS signals may be adjusted to be cos(θ) and sin(θ) where θ is varied in four 45° steps or eight 22.5° steps, depending on the number of outputs from the power combiners. In some embodiments, both a phase shift and an amplitude adjustment are applied to the AIS signals. In other embodiments, either a phase shift or an amplitude adjustment is applied to the AIS signals, but not both. For example, typically where the receiver unit 202 has two linearly polarized antennas at right angles to each other, there is amplitude adjustment, but no phase shift.

At (710), the equivalent AIS signals and the phase shifted AIS signals are combined to form a plurality of combined AIS signals. For example in one embodiment, each equivalent AIS signal corresponding to the first AIS signal is combined with one of the phase shifted AIS signals corresponding to the second AIS signal. It will be apparent to a person of skill in the art that other combinations of signals are possible.

At (712), each combined signal is processed or decoded by an AIS receiver to produce a plurality of message segments contained therein. In some embodiments, the combined AIS signals are processed or decoded in parallel by a plurality of AIS receivers (i.e. one AIS receiver for each combined signal). In other embodiments the combined AIS signals are stored and sequentially passed through a single AIS receiver.

Figure 8:
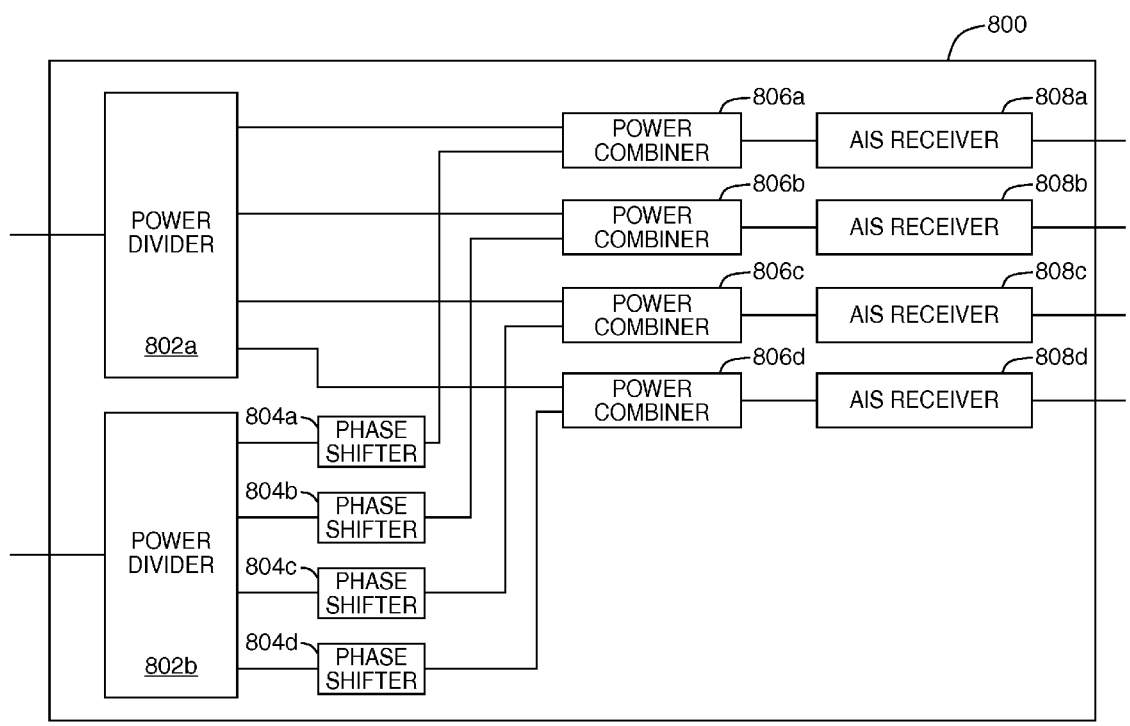
FIG. 8 is a block diagram of an exemplary decoder unit for implementing the method of FIG. 7.

Reference is now made to FIG. 8, wherein a block diagram of a decoder unit 800 for implementing the method 700 of FIG. 7 is illustrated. The decoder unit 800 includes a plurality of power dividers 802a and 802b (typically one for each antenna), a plurality of phase shifters 804a to 804d, a plurality of power combiners 806a to 806d, and one or more AIS receivers 808a to 808d.

Each power divider 802a and 802b receives an AIS signal from one of the antennas of the receiver unit 202 and splits the received AIS signal into a plurality of equivalent AIS signals. In one embodiment, one of the power dividers (e.g. the second power divider 802b) supplies each of the phase shifters 804a to 804d with one AIS signal, and one of the power dividers (e.g. the first power divider 802a) supplies each of the power combiners 806a to 806d with the other AIS signal. Power dividers are well known in the art and may be implemented in a variety of ways. In one embodiment, each of the power dividers 802a and 802b may be implemented using a standard RF splitter. Where the received AIS signals are in digital form the power dividers 802a to 802b may be implemented digitally in software. However, it will be evident to an ordinary person of skill in the art that these are example implementations only, and the power dividers 802a and 802b may be implemented using other components or techniques.

Each phase shifter 804a to 804d receives a copy of one of the AIS signals and applies a different phase shift to the received AIS signal to produce a corresponding phase shifted AIS signal. In some embodiments, each phase shifter applies a predetermined phase shift to the received AIS signal. For example, in one embodiment, such as the embodiment shown in FIG. 8, there are four phase shifters 804a to 804d that provide phase shifts of 0°, 90°, 180° and 270° respectively. In this embodiment, one of the phase shifts will be within 45° of the ideal phase shift. In another embodiment, there are eight phase shifters that provide phase shifts of 0°, 45°, 90°, 135°, 180°, 225°, 270° and 315°. In this embodiment, one of the phase shifts will be within 22.5° of the ideal phase shift. It will be apparent to a person of skill in the art that the number of phase shifts may be increased or decreased without affecting the operation of the decoder unit 800. Similarly different values of phase shift may be used without affecting the operation of the decoder unit 800.

In other embodiments, the phase shifts applied by the phase shifters 804a to 804d may be adaptively or dynamically adjusted. For example, as described above, the decoder unit 800 may monitor the number of message segments extracted by each phase combination and then may favor the phase combinations that produce more message segments.

The phase shifters 804a to 804d may be implemented in digital or analog form depending on whether the received AIS signals are in digital or analog form. For example, where the received AIS signals are in analog form, the phase shifters 804a to 804d may be implemented by different lengths of coaxial cable. Where the received AIS signals are in digital form the phase shifters 804a to 804b may be implemented digitally in software. However, it will be clear to an ordinary person of skill in the art that these are example implementations only, and the phase shifters 804a to 804d may be implemented using other known components and techniques.

Each of the power combiners 806a to 806d receives one AIS signal from one of the power dividers (e.g. first power divider 802a) and a phase shifted version of the other AIS signal from one of the phase shifters 804a to 804d and combines the received signals to produce a combined AIS signal.

The power combiners 806a to 806d may be implemented in digital or analog form depending on whether the received AIS signals are in digital or analog form. For example, where the received AIS signals are in analog form, the power combiners 806a to 806d may be implemented using standard RF (radio frequency) components such as connectorized 50Ω output components. Where the received AIS signals are in digital form the power combiners 806a to 806b may be implemented digitally in software. However, it will be evident to an ordinary person of skill in the art that these are example implementations only, and the power combiners 806a to 806d may be implemented using other components and techniques.

Each of the combined signals is then processed by an AIS receiver. In some embodiments, such as that shown in FIG. 8, there is a plurality of AIS receivers 808a to 808d and each AIS receiver receives one of the combined AIS signals generated by one of the power combiners 806a to 806d and extracts the message segments contained therein. In other embodiments, there may be a single receiver and the combined AIS signals are stored in a memory module (not shown) and sequentially passed through the AIS receiver. Each AIS receiver 808a to 808d may be a standard receiver, such as the EURONAV™ AI3000 or the Smart Radio Holdings Limited™ SR162 Professional AIS Receiver; or a proprietary receiver, such as that described in U.S. Published Patent Application No. 2008/0304597 to Peach.

In some embodiments, the system 800 may also include a plurality of attenuators or amplifiers (not shown) to apply amplitude weighing to the received signals prior to combining them. In one embodiment, there is one attenuator or amplifier for each of the signals produced by the power dividers 802a and 802b and each amplifier is situated between a power divider 802*a* or 802*b* and a phase shifter 804*a* to 804*d* or a power combiner 806*a* to 806*d*. The attenuators or amplifiers may be implemented in analog or digital form depending on whether the received AIS signals are in digital or analog form.

The decoder unit 800 of FIG. 8 should been seen as a generalization of the embodiment described herein for the two-antenna arrangement. Where there are more than two antennas, the decoder unit would combine the various antenna outputs in various phase combinations in a similar fashion as described for the two-antenna embodiment described in reference to FIG. 8.

Figure 9:
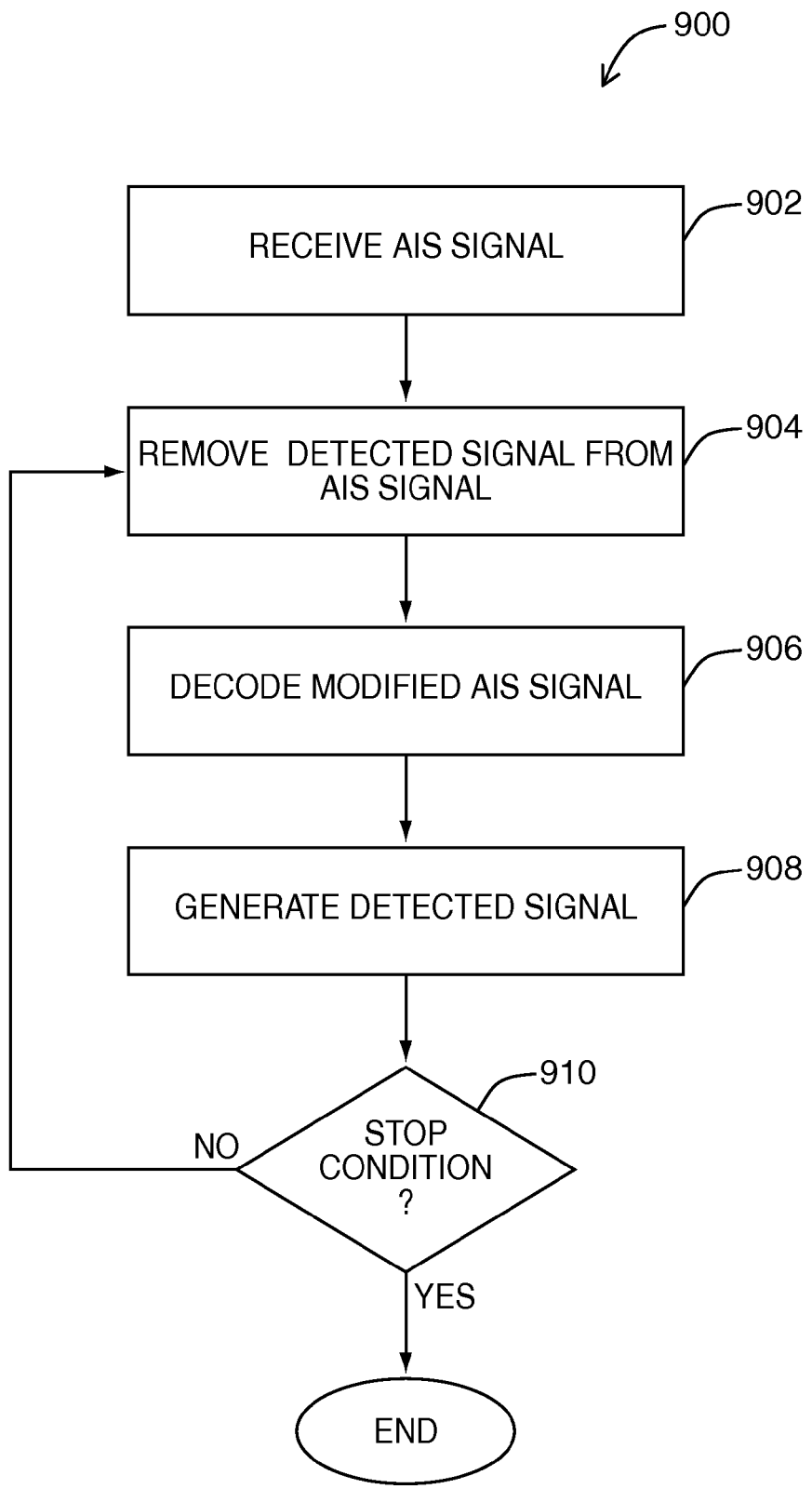
FIG. 9 is a flowchart of a method for extracting message segments from AIS signals received by a LEO satellite in accordance with a fourth embodiment.

Reference is now made to FIG. 9, wherein a method 900 for extracting message segments from AIS signals received by an LEO satellite in accordance with a fourth embodiment is illustrated. This method 900 uses a successive interference cancellation technique to generate multiple versions of the received AIS signals. Specifically, the strongest AIS signals are detected and recorded. Replicas of these signals are then subtracted from the input signal to generate a new input signal. In the new signal, weaker signals that were not detected on the first pass because of interference from the stronger signals can then be detected. This procedure may be used recursively, generating a new signal at each iteration by subtracting off replicas of the most recently detected message segments.

At (902) an AIS signal is received from the receiver unit 202 and saved in a memory module. Once the AIS signal has been received, the method 900 proceeds to (904).

At (904), the saved AIS signal is retrieved from the memory module and an AIS signal representing the previously extracted message segments is subtracted from the saved AIS signal producing a modified AIS signal. The modified AIS signal is then saved in the memory module for use in a subsequent iteration of the method. Once the AIS signal representing the previously extracted message segment has been subtracted from the saved AIS signal, the method 900 proceeds to (906).

At (906), the modified AIS signal generated at (904) is processed by an AIS receiver to extract the plurality of message segments contained therein. Once the messages segments have been extracted, the method proceeds to (908).

At (908), a version of the original AIS signal corresponding to the message segments extracted in (906) is constructed. In addition to the message segments themselves, typically the following information is required to generate an accurate version of the original AIS signal corresponding to the extracted message segments: the amplitude of the signal, the frequency of the signal (including the Doppler shift), the phase and timing, and the modulation index. In some embodiments, this information is determined using a least-squares fit model. For example, initial signal parameters such as amplitude, frequency, phase and timing (and sometimes Doppler shift) may be estimated by the AIS receiver and then the parameters may be adjusted using a non-linear least-squares fit model. This involves adjusting the signal parameter values until the smallest least-squares differences exists between the ideal signal and the original data. This may be implemented using a standard optimization method that employs an iterative procedure. Exemplary methods for implementing the least-squares fit model are described in Simon Haykin, *Adaptive Filter Theory* (3$^{rd}$ Ed.)(Prentice Hall, 2005). Once a version of the original AIS signal corresponding to the extracted message segments has been constructed, the method 900 proceeds to (910).

At (910), it is determined whether at least one stop condition is satisfied. If at least one stop condition is satisfied, then the method 900 ends. If, however, none of the stop conditions are satisfied then the method 900 proceeds back to (904) where the AIS signal generated at (908) is subtracted from the saved AIS signal and the resulting signal is then processed by an AIS receiver to extract the message segments contained therein.

In some embodiments, the stop condition is based on the number of message segments extracted in the iteration. For example, the method 900 may stop when the number of message segments extracted in a particular iteration drop below a predetermined threshold. Since the number of new message segments extracted in each successive iteration will decrease very rapidly, it is likely that only two iterations of the method will be executed.

Figure 10:
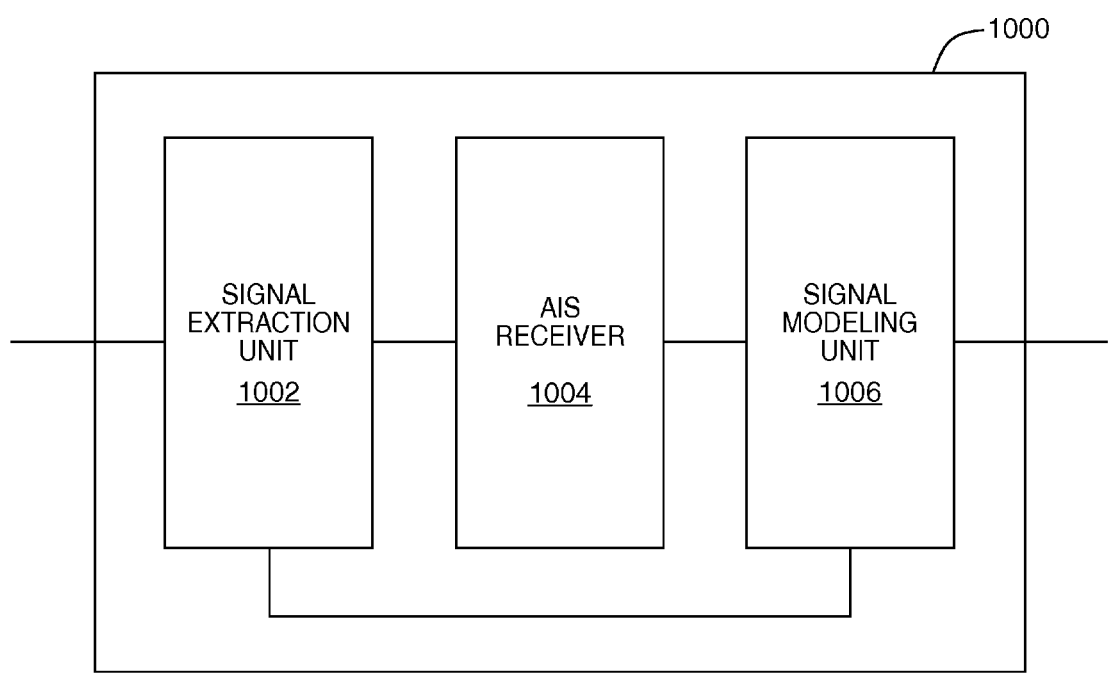
FIG. 10 is block diagram of an exemplary decoder unit for implementing the method of FIG. 9.

Reference is now made to FIG. 10, wherein a block diagram of an exemplary decoder unit 1000 for implementing the method 900 of FIG. 9 is illustrated. The decoder unit 1000 includes a signal extraction unit 1002, an AIS receiver 1004, and a signal modeling unit 1006.

The signal extraction unit 1002 receives an AIS signal from the receiver unit 202 and an extraction signal from the signal modeling unit 1006. The signal extraction unit 1002 subtracts the extraction signal from the AIS signal to produce a modified AIS signal. If the signal extraction unit 1002 does not receive an extraction signal from the signal modeling unit 1006 then the signal extraction unit 1002 makes no changes to the received AIS signal and the modified AIS signal is equal to the received AIS signal. This typically occurs the first time the AIS signal is passed through the decoder unit 1000 (i.e. before any message segments have been extracted from the AIS signal).

The signal extraction unit 1002 also typically stores a copy of the modified AIS signal for further processing in successive iterations of the method. Accordingly, the signal extraction unit 1002 may include a memory unit for storing the modified AIS signal.

The signal extraction unit 1002 may be implemented in digital or analog form, depending on whether the received AIS signal is in digital or analog form. For example, where the received AIS signal is in analog form, the signal extraction unit 1002 may include a two-way combiner to perform the subtraction. However, it will be evident to a person of skill in the art that the signal extraction unit 1002 may be implemented using other components or techniques.

The AIS receiver 1004 receives the modified AIS signal from the signal extraction unit 1002 and detects or extracts the message segments contained therein. The AIS receiver 1004 may be a standard receiver, such as the EURONAV™ AI3000 or the Smart Radio Holdings Limited™ SR162 Professional AIS Receiver; or a proprietary receiver, such as that described in U.S. Published Patent Application No. 2008/0304597 to Peach.

The signal modeling unit 1006 receives the message segments extracted by the AIS receiver 1004, determines the parameters of the original AIS signal for each of the message segments and reconstructs and outputs a re-generated version of the original AIS signal corresponding to the extracted message segments. As described above, typically the following additional information is required to generate an accurate version of the original AIS signal corresponding to the extracted message segments: the amplitude of the signal, the frequency of the signal (including the Doppler shift), the phase and timing, and the modulation index. In some embodiments, this information is determined using a least-squares fit model. For example, initial signal parameters such as amplitude, frequency, phase and timing (and sometimes Doppler shift) may be estimated by the AIS receiver and then the parameters may be adjusted using a least-squares fit model. This involves adjusting the signal parameter values until the smallest least-squares differences exists between the ideal signal and the original data. This may be implemented using a standard optimization method that employs an iterative procedure.

The signal modeling unit 1006 may be implemented using digital or analog components, or a combination of digital and analog components. For example, the parameter adjustments may be implemented using digital circuitry and then a standard AIS transmitter may be used to generate an analog version of the original AIS signal. However, in most cases, the original AIS signal would be digitally generated. In some embodiments, a single unit performs both the signal extraction unit 1002 functions and the signal modeling unit 1006 functions.

The reconstructed version of the original AIS signal corresponding to the extracted message segments generated by the signal modeling unit 1006 is sent to the signal extraction unit 1002 where it is subtracted from the original AIS signal. The modified AIS signal is then reprocessed or decoded by the AIS receiver 1004 in an attempt to identify additional message segments.

It will be evident to a person of skill in the art that each of the methods described herein may be implemented separately or in combination. In one embodiment, the second and third methods 500 and 700 described herein may be combined by first performing filtering on the plurality of AIS signals received by the plurality of antennas and then combining the filtered signals in a number of amplitude and phase combinations. For example, if there are two AIS signals received by two antennas, each of the received signals would be split into N signals, each group of N signals would then be fed into identical N channel filter banks. The pairs of corresponding outputs from the filter banks would then be combined in M possible amplitude and phase combinations to produce N×M variations of the AIS signal. The AIS signals may then be processed sequentially by a signal AIS receiver or in parallel by a plurality of AIS receivers.

In another embodiment, the second and third methods 500 and 700 described herein may be combined by first combining the plurality of AIS signals and then filtering the combined signals. Specifically the plurality of AIS signals received by the plurality of antennas may be combined in M different amplitude and phase combinations, and then each of these combinations may then be fed into a separate N channel filter bank, producing N×M variations of the AIS signal. The AIS signals may then be processed sequentially by a signal AIS receiver or in parallel by a plurality of AIS receivers.

Either of these embodiments may then implement the first or fourth methods 300 and 900 in the subsequent AIS receiver(s).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method of extracting, from at least one signal received by a satellite, message segments employed in the maritime communications Automatic Identification System (AIS), the method comprising:

(a) receiving at least one AIS signal from at least one satellite antenna;
   (b) generating multiple versions of the at least one AIS signal;
   (c) extracting message segments contained within each of the multiple versions of the at least one AIS signal using at least one AIS receiver, wherein each message segment comprises at least a Maritime Mobile Service Identity (MMSI);
   (d) sorting the message segments by time; and
   (e) deleting any duplicate message segments.

2. The method of claim 1, wherein generating multiple versions of the at least one AIS signal comprises varying at least one of (i) a parameter of the at least one AIS signal; and (ii) a parameter of the at least one AIS receiver.

3. The method of claim 2, wherein the parameters of the at least one AIS signal comprise the frequency and amplitude of the at least one AIS signal.

4. The method of claim 2, wherein the parameters of the at least one AIS receiver comprise centre frequency, frequency response, and bandwidth of a bandpass filter internal to the at least one AIS receiver.

5. The method of claim 2, wherein the parameters of the at least one AIS signal and the at least one AIS receiver are varied in a predetermined manner.

6. The method of claim 2, wherein the parameters of the at least one AIS signal and the at least one AIS receiver are varied in an adaptive manner based on the number of message segments extracted.

7. The method of claim 1, wherein generating multiple versions of the at least one AIS signal comprises:

(b.1) splitting the at least one AIS signal into a predetermined number of equivalent AIS signals; and
   (b.2) filtering each of the equivalent AIS signals using a separate bandpass filter to produce the multiple versions of the at least one AIS signal.

8. The method of claim 7, wherein the number of bandpass filters and the bandwidth of each of the bandpass filters are selected in accordance with $$B_c = B + (N-1)*(B-B_D) = 9N*B - (N-1)*B_D$$

where $B_D$ is the minimum bandwidth to extract message segments, B is the bandwidth of each bandpass filter, $B_c$ is the bandwidth of the AIS channel and N is the number of bandpass filters.

9. The method of claim 8, wherein the bandwidth of each bandpass filter is between approximately 10 kHz and approximately 14 kHz.

10. The method of claim 9, wherein the number of bandpass filters is 7 and the bandwidth of each bandpass filter is approximately 12 kHz.

11. The method of claim 1, wherein first and second AIS signals are received from first and second antennas respectively, and generating multiple versions of the at least one AIS signal comprises:

(b.1) splitting the first AIS signal into a predetermined number of first equivalent AIS signals;
   (b.2) splitting the second AIS signal into the predetermined number of second equivalent AIS signals;
   (b.3) phase shifting each of the second equivalent AIS signals by a different amount to produce a plurality of phase shifted AIS signals; and
   (b.4) combining each of the first equivalent AIS signals with one of the phase shifted AIS signals to produce the multiple versions of the at least one AIS signal.

12. The method of claim 11, wherein the amount of each phase shift is predetermined.

13. The method of claim 12, wherein the predetermined number is four and the amount of the phase shifts is 0°, 90°, 180° and 270°.

14. The method of claim 12, wherein the predetermined number is eight and the amount of the phase shifts is 0°, 45°, 90°, 135°, 180°, 225°, 270°, and 315°.

15. The method of claim 11, wherein the amount of each phase shift is adaptively determined based on the number of message segments extracted from each of the multiple versions of the at least one AIS signal.

16. The method of claim 11, wherein generating multiple versions of the at least one AIS signal further comprises adjusting the amplitude of at least one of the first equivalent AIS signals and the phase shifted AIS signals prior to combining each of the first equivalent AIS signals with one of the phase shifted AIS signals.

17. The method of claim 1, wherein generating multiple versions of the at least one AIS signal comprises:
 (b.1) generating an AIS signal representing the extracted message segments; and (b.2) subtracting the AIS signal representing the extracted message segments from the at least one AIS signal to generate a version of the at least one AIS signal.

18. The method of claim 17, wherein generating multiple versions of the at least one AIS signal further comprises repeating steps (b.1) to (b.2) until a number of new extracted messages falls below a predetermined threshold.

19. The method of claim 1, wherein first and second AIS signals are received from first and second antennas respectively, and generating multiple versions of the at least one AIS signal comprises:
 (b.1) splitting the first AIS signal into a first predetermined number of first equivalent AIS signals;
 (b.2) splitting the second AIS signal into the first predetermined number of second equivalent AIS signals;
 (b.3) filtering each of the first equivalent AIS signals using a separate bandpass filter to produce a plurality of first filtered AIS signals;
 (b.4) filtering each of the second equivalent AIS signals using a separate bandpass filter to produce a plurality of second filtered AIS signals;
 (b.5) splitting each of the first filtered AIS signals into a second predetermined number of first equivalent filtered AIS signals;
 (b.6) splitting each of the second filtered AIS signals into the second predetermined number of second equivalent filtered AIS signals;
 (b.7) applying at least one of a phase shift and an amplitude shift to each of the second equivalent filtered AIS signals to produce a plurality of shifted AIS signals, wherein different phase and amplitude shifts are applied to each of the second equivalent filtered AIS signals corresponding to a particular second filtered AIS signal; and
 (b.8) combining each of the first equivalent filtered AIS signals with one of the shifted AIS signals to produce the multiple versions of the at least one AIS signal.

20. The method of claim 1, wherein first and second AIS signals are received from first and second antennas respectively, and generating multiple versions of the at least one AIS signal comprises:
 (b.1) splitting the first AIS signal into a first predetermined number of first equivalent AIS signals;
 (b.2) splitting the second AIS signal into the first predetermined number of second equivalent AIS signals;
 (b.3) applying at least one of a phase shift and an amplitude shift to each of the second equivalent AIS signals to produce a plurality of shifted AIS signals, wherein different phase and amplitude shifts are applied to each of the second equivalent AIS signals;
 (b.4) combining each of the first equivalent AIS signals with one of the shifted AIS signals to produce a plurality of combined AIS signals;
 (b.5) splitting each of the combined AIS signals into a second predetermined number of equivalent combined AIS signals; and
 (b.6) filtering each of the equivalent combined AIS signals using a separate bandpass filter to produce the multiple versions of the at least one AIS signal.

* * * * *